(12) United States Patent
Sahm

(10) Patent No.: US 12,228,153 B2
(45) Date of Patent: Feb. 18, 2025

(54) VACUUM-ENABLED FLUID COMPRESSION AND EVACUATION APPARATUS, CONTROL, AND ASSOCIATED METHODS

(71) Applicant: TPE MIDSTREAM LLC, Tulsa, OK (US)

(72) Inventor: Douglas A. Sahm, Lutz, FL (US)

(73) Assignee: TPE MIDSTREAM LLC, Tulsa, OK (US)

(\*) Notice: Subject to any disclaimer, the term of this patent is extended or adjusted under 35 U.S.C. 154(b) by 25 days.

(21) Appl. No.: 18/042,171

(22) PCT Filed: Sep. 1, 2021

(86) PCT No.: PCT/US2021/048712
§ 371 (c)(1),
(2) Date: Feb. 17, 2023

(87) PCT Pub. No.: WO2022/051396
PCT Pub. Date: Mar. 10, 2022

(65) Prior Publication Data
US 2023/0349404 A1    Nov. 2, 2023

Related U.S. Application Data

(60) Provisional application No. 63/125,762, filed on Dec. 15, 2020, provisional application No. 63/073,649, filed on Sep. 2, 2020.

(51) Int. Cl.
*F15D 1/02* (2006.01)
*F16L 55/07* (2006.01)

(52) U.S. Cl.
CPC ............... *F15D 1/02* (2013.01); *F16L 55/07* (2013.01)

(58) Field of Classification Search
CPC .................................. F16L 55/07; F15D 1/02
See application file for complete search history.

(56) References Cited

U.S. PATENT DOCUMENTS

| 5,137,047 A | 8/1992 | George |
| 2020/0114402 A1 | 4/2020 | Inada et al. |
| 2023/0304620 A1* | 9/2023 | Sahm ................. F17D 5/00 |

FOREIGN PATENT DOCUMENTS

| EP | 0382985 A1 | 8/1990 |
| JP | 2003021292 A | 1/2003 |

(Continued)

OTHER PUBLICATIONS

International Searching Authority, "International Search Report and Written Opinion," issued in connection with PCT No. PCT/US2021/048712, mailed Dec. 1, 2021, 9 pages.

(Continued)

*Primary Examiner* — Timothy L Maust
(74) *Attorney, Agent, or Firm* — Hanley, Flight & Zimmerman, LLC

(57) ABSTRACT

An apparatus to evacuate fluid from a pipe is disclosed herein. The example apparatus includes a pressure gauge coupled to a pipe, a fluid evacuation system coupled to the pipe, the fluid evacuation system to evacuate a first fluid from the pipe and, in response to the pressure gauge measuring a first pressure in the pipe, stop evacuating the first fluid from the pipe, and a gas supply coupled to the pipe, the gas supply to supply a second fluid to the pipe and, in response to the pressure gauge measuring a second pressure in the pipe, stop supplying the second fluid to the pipe.

20 Claims, 14 Drawing Sheets

(56) References Cited

FOREIGN PATENT DOCUMENTS

| | | |
|---|---|---|
| JP | 2006125605 A | 5/2006 |
| JP | 2009024772 A | 2/2009 |
| KR | 20100037674 A | 4/2010 |
| KR | 20180000086 U | 1/2018 |
| WO | 2009057065 A1 | 5/2009 |

OTHER PUBLICATIONS

International Searching Authority, "International Preliminary Report on Patentability," issued in connection with International Application No. PCT/US2021/048712, mailed on Mar. 7, 2023, 6 pages.

IP Australia, "Examination Report No. 1," issued in connection with Australian Application No. 2021338289, issued on Jul. 4, 2023, 4 pages.

Canadian Intellectual Property Office, "Examiner Requisition," issued in connection with Canadian Patent Application No. 3,159,830, issued on Aug. 4, 2023, 5 pages.

Intellectual Property Office, "Examination Report," issued in connection with Great British Patent Application No. GB2302996.0, issued on Dec. 11, 2023, 2 pages.

Saudi Authority for Intellectual Property, "First Examination Report," issued in connection with Saudi Arabian Patent Application No. 523442759, issued on Dec. 18, 2023, 7 pages. Machine translation included.

Intellectual Property Office, "Examination Report," issued in connection with British Patent Application No. 2302996.0, issued on May 1, 2024, 4 pages.

IP Australia, "Notice of Allowance," issued in connection with Australian Application No. 2021338289, issued on Dec. 8, 2023, 4 pages.

Saudi Authority for Intellectual Property Office, "Notice of Substantive Examination Report," issued in connection with Saudi Patent Application No. 523442759, dated Jun. 3, 2024, 14 Pages, English translation included.

Canadian Intellectual Property Office, "Examiner Requisition," issued in connection with Canadian Patent Application No. 3,159,830, dated Jun. 13, 2024, 3 pages.

Intellectual Property Office, "Intention to Grant under Section 18(4)," issued in connection with UK Patent Application No. 2302996.0, dated Jul. 19, 2024, 2 pages.

Saudi Authority for Intellectual Property Office, Notice of Substantive Examination Report, issued in connection with Saudi Patent Application No. 524452090, dated Jul. 28, 2024, 14 Pages, English translation included.

European Patent Office, "Extended European Search Report," issued in connection with European Patent Application No. 21865052.1, issued on Aug. 1, 2024, 17 pages.

European Patent Office, "Communication pursuant Rules 70(2) and 70a(2) EPC - Supplementary Search Report," issued in connection with European Patent Application No. 21865052.1-1004, dated Aug. 21, 2024, 11 page.

Intellectual Property Office, "Combined Search and Examination Report under Sections 17 and 18(3)," issued in connection with UK Patent Application No. 2411956.2, dated Sep. 2, 2024, 3 pages.

* cited by examiner

| | Time (minutes) | Gauge Pressure (psig) | Absolute Pressure (psia) | Air Concentration (%) | Gas Concentration at 0 psig (%) | Gas Concentration at 12 psig (%) |
|---|---|---|---|---|---|---|
| 400A | 0 | 0 | 14.70 | 100 | | |
| 400B | 1 | -1.47 | 13.23 | 90 | 10 | 50 |
| 400C | 2 | -2.79 | 11.91 | 81 | 19 | 55 |
| 400D | 3 | -3.98 | 10.72 | 73 | 27 | 60 |
| 400E | 4 | -5.06 | 9.64 | 66 | 34 | 64 |
| 400F | 5 | -6.02 | 8.68 | 59 | 41 | 67 |
| 400G | 6 | -6.89 | 7.81 | 53 | 47 | 71 |
| 400H | 7 | -7.67 | 7.03 | 48 | 52 | 74 |
| 400I | 8 | -8.37 | 6.33 | 43 | 57 | 76 |
| 400J | 9 | -9.00 | 5.70 | 39 | 61 | 79 |
| 400K | 10 | -9.57 | 5.13 | 35 | 65 | 81 |
| 400L | ... | ... | ... | ... | ... | ... |
| 400M | 20 | -12.91 | 1.79 | 12 | 88 | 93 |
| 400N | 21 | -13.09 | 1.61 | 11 | 89 | 94 |
| 400O | 22 | -13.25 | 1.45 | 10 | 90 | 95 |
| 400P | 23 | -13.40 | 1.30 | 9 | 91 | 95 |
| 400Q | 24 | -13.53 | 1.17 | 8 | 92 | 96 |
| 400R | 25 | -13.64 | 1.06 | 7 | 93 | 96 |
| 400S | 26 | -13.75 | 0.95 | 6 | 94 | 96 |
| 400T | 27 | -13.84 | 0.86 | 6 | 94 | 97 |
| | 28 | -13.93 | 0.77 | 5 | 95 | 97 |

FIG. 4

VACUUM-ENABLED FLUID COMPRESSION AND EVACUATION APPARATUS, CONTROL, AND ASSOCIATED METHODS

RELATED APPLICATIONS

This patent arises from a U.S. National Stage Patent Application under U.S.C. 371 of PCT Patent Application No. PCT/US21/48712, titled "Vacuum-Enabled Fluid Compression and Evacuation Apparatus, Control, and Associated Methods," filed Sep. 1, 2021, which claims priority to U.S. Provisional Application No. 63/073,649," titled "Vacuum-Enabled Fluid Compression and Evacuation Apparatus, Control, and Associated Methods," filed Sep. 2, 2020, and U.S. Provisional Application No. 63/125,762, titled "Vacuum-Enabled Fluid Compression and Evacuation Apparatus, Control, and Associated Methods," filed Dec. 15, 2020. PCT Patent Application No. PCT/US21/48712, U.S. Provisional Application No. 63/073,649, and U.S. Provisional Application No. 63/125,762 are hereby incorporated by reference in their entireties.

FIELD OF THE DISCLOSURE

This disclosure relates generally to compressors, and, more particularly, to vacuum-enabled fluid compression and evacuation apparatus, control, and associated methods.

BACKGROUND

In a gas pipeline, a new pipe can be inserted into service to replace or add to an existing length of pipe. When a new pipe is constructed, the new pipe contains air from the open environment. During commissioning of the new pipe, gas is introduced to the new pipe until a desired gas-air ratio is achieved.

BRIEF DESCRIPTION OF THE DRAWINGS

FIG. 4 illustrates an example table used to determine a negative pressure threshold for an emission-less commissioning procedure described in connection with FIG. 2.

Figure 1:
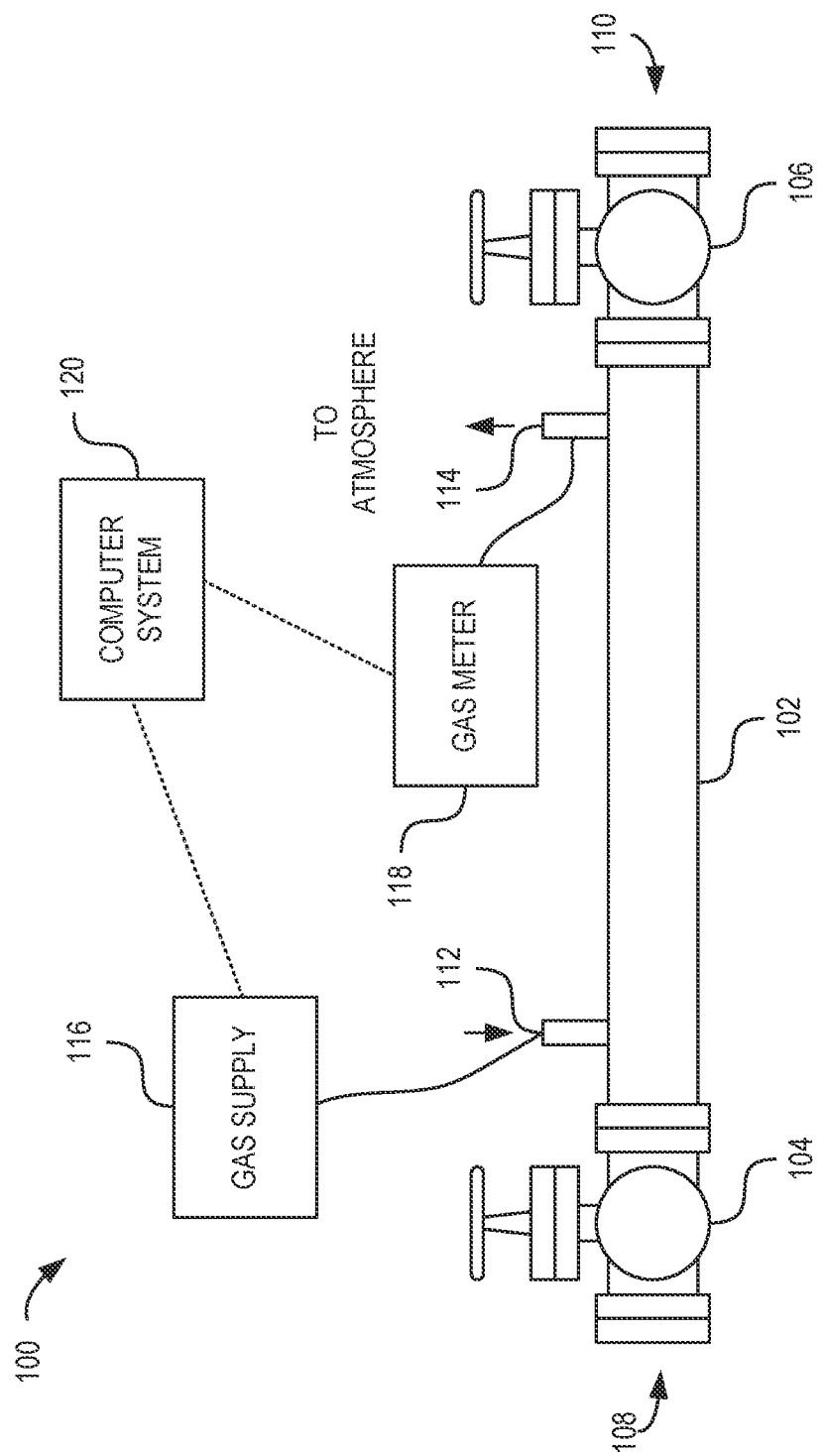
FIG. 1 illustrates a known commissioning setup implemented on an example pipe.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Pipelines are used to transport a fluid (e.g., gas) between one or more locations. When a new pipe is constructed, the new pipe is open to and filled with air from the atmosphere. To put the new pipe into service (e.g., to fluidly couple the new pipe to an existing pipeline), a commissioning procedure can be performed. During commissioning, the air is evacuated from the new pipe and gas is introduced to the new pipe.

Typically, to fluidly couple the new pipe to the existing pipeline, the new pipe is sealed at both ends (e.g., via one or more valves) and welded and/or otherwise connected to the existing pipeline. A gas supply can be coupled to the new pipe proximate a first end of the new pipe, and a vent proximate the second end of the new pipe can be opened. The gas supply can be turned on to pump gas into the new pipe. The gas can mix with the air inside the new pipe and force an air-gas mixture to exit via the vent to the atmosphere. As the gas supply pumps the gas into the new pipe, a percentage of gas in the new pipe increases while a percentage of air decreases (e.g., a gas-air ratio inside the new pipe increases). Similarly, the gas-air ratio of the gas-air mixture exiting the vent continues to increase as the gas is pumped into the new pipe. As such, a fraction of the gas pumped into the new pipe is vented to the atmosphere along with the air. In response to the gas percentage of the gas-air mixture inside the new pipe reaching a desired threshold (e.g., 95%, 90%, etc.), the vent can be closed and the gas supply can be shut off and/or removed (e.g., to prevent additional gas from being pumped into the new pipe). The valves and/or seals at each end of the new pipe can be opened, and gas service can continue in the pipeline using the new pipe.

In the commissioning procedure described above, a volume of the gas vented to the atmosphere can depend on a size of the new pipe and/or the desired gas-air ratio. In some cases, the gas-air mixture may be vented to the atmosphere for long periods of time (e.g., several hours) before the desired gas-air ratio is achieved. As such, a typical commissioning procedure can cause a significant amount of the gas to be lost to the atmosphere, thus increasing costs associated with the commissioning procedure. Additionally, the gas vented to the atmosphere can be harmful to the environment and may pose a safety concern due to a risk of accidental combustion of the gas-air mixture.

In examples disclosed herein, an example fluid compression and evacuation system can be configured to evacuate air from a new pipe prior to gas being introduced. In examples disclosed herein, one or more compressors pump and/or vacuum the air from the new pipe until the new pipe is nearly empty and/or a desired air percentage is achieved. The air can be released to the atmosphere, and the gas can then be introduced to the new pipe to reach the desired gas-air ratio. In examples disclosed herein, gas is not vented to the atmosphere during commissioning. Advantageously, examples disclosed herein can reduce costs associated with commissioning and reduce the effects and/or risks of releasing the gas-air mixture. Although the following systems and methods can apply to a variety of fluids, gas is used as an example in the following description.

FIG. 1 illustrates a known commissioning setup 100 implemented on an example pipe 102. In the illustrated example of FIG. 1, the pipe 102 includes a first valve (e.g., ball valve) 104 and a second valve 106 coupled at a first end 108 and a second end 110 of the pipe 102. The example pipe 102 further includes an example gas inlet 112 and an example vent 114. In the illustrated example of FIG. 1, the gas inlet 112 is fluidly coupled to a gas supply 116 and the vent 114 is coupled to a gas meter 118.

Prior to commissioning, the example pipe 102 is open to and filled with air from the atmosphere. For example, the air enters the pipe 102 via the first end 108 and/or the second end 110. In some examples, the pipe 102 is added to a pipeline system and/or replaces a section of pipe in the pipeline system. In such examples, a commissioning procedure is performed on the pipe 102 to begin and/or resume gas service in the pipeline system.

To begin the commissioning procedure, the pipe 102 is sealed at both ends by closing the first valve 104 and the second valve 106, thus preventing air from exiting or further entering the pipe 102. In some examples, the pipe 102 can be installed in the pipeline system by welding to and/or otherwise coupling to existing pipe in the pipeline system. In response to the pipe 102 being coupled to the existing pipe, the vent 114 can be opened so that the air from the pipe 102 is allowed to exit the pipe 102 via the vent 114. Further, the gas supply 116 is turned on so that gas can be pumped from the gas supply 116 to the pipe 102.

As gas enters the pipe 102, the gas mixes with the air in the pipe 102 to create a gas-air mixture. Additionally, in response to the gas being introduced into the pipe 102, the gas causes an increase in volume of fluid (e.g., the gas-air mixture) in the pipe 102 and forces a flow of the gas-air mixture to exit the pipe 102 via the vent 114, so that the gas-air mixture is vented to the atmosphere. As the gas supply 116 supplies gas to the pipe 102, a gas-air ratio of the gas-air mixture in the pipe 102 increases (e.g., a concentration of gas in the pipe 102 compared to a concentration of air in the pipe 102 increases). For example, the fluid in the pipe 102 begins at 0% gas and 100% air, and increases to 10% gas and 90% air, 20% gas and 80% air, etc. As such, the gas-air mixture exiting from the pipe 102 via the vent 114 also increases in gas concentration.

In the illustrated example of FIG. 1, the example gas meter 118 is implemented at the vent 114 to measure the gas concentration of the gas-air mixture exiting the pipe 102. Additionally or alternatively, the gas meter 118 can be configured to measure one or more gas flow characteristics (e.g., flow rate, temperature, pressure, etc.). In some examples, the gas meter 118 can display a value of the measured gas concentration. In the illustrated example, a desired gas concentration of the gas-air mixture in the pipe 102 is 95%. For example, the gas-air mixture delivered via the pipe 102 to end users must be 95% gas before gas service may resume. In other examples, a different threshold of the desired gas concentration (e.g., 90%, 98%, etc.) can be used. In the illustrated example, when the gas meter 118 measures and/or displays a value of the gas concentration that is at or above the threshold, an operator can shut off and/or remove the gas supply 116 and close the vent 114 to prevent fluid from further entering or exiting the pipe 102. To complete the commissioning procedure, the first valve 104 and the second valve 106 can be opened (e.g., manually by the operator) to begin and/or resume gas flow between the first end 108 and the second end 110 of the pipe 102.

In some examples, a computer system 120 can be communicatively coupled to the gas supply 116 and/or the gas meter 118. In some examples, the desired threshold (e.g., gas concentration threshold, threshold) is manually adjusted and/or configured on the gas meter 118 by an operator. For example, the operator can adjust the threshold by adjusting a dial on the gas meter 118. In other examples, the threshold can be controlled via a command signal from the computer system 120. In some examples, the gas meter 118 can transmit a value of the measured gas concentration to the computer system 120 and/or can send an alert to the computer system 120 in response to the measured gas concentration being at or above the threshold. In some examples, the computer system 120 can close the vent 114 and/or shut off the gas supply 116 in response to determining that the measured gas concentration of the gas-air mixture is at or above the threshold.

During the commissioning procedure, gas is pumped into the pipe 102 from the gas supply 116 and the gas-air mixture is vented to the atmosphere until the desired gas concentration is reached. In some examples, the procedure can occur over a relatively long period of time (e.g., several hours), during which a significant amount of gas is lost to the atmosphere. Loss of the gas to the atmosphere can increase costs due to an increase in the amount of gas required for commissioning. Additionally, releasing gas to the atmosphere may have harmful environmental effects, and can pose a safety concern due to risk of accidental ignition of the gas-air mixture exiting the vent 114.

Figure 2:
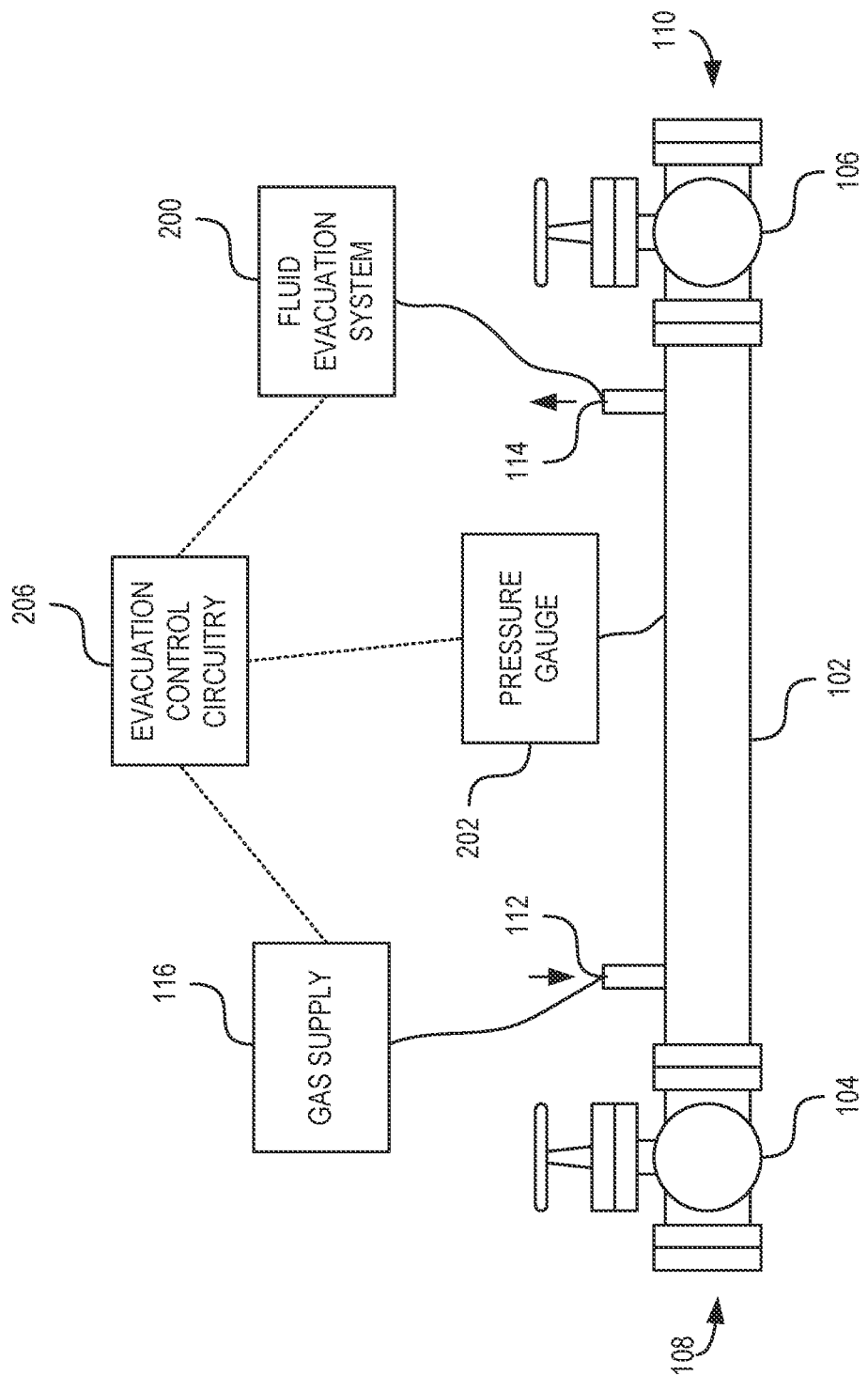
FIG. 2 illustrates an example fluid evacuation system implemented on the example pipe of FIG. 1.

FIG. 2 illustrates an example fluid evacuation system (e.g., fluid compression evacuation system) 200 used in connection with examples disclosed herein. The example fluid evacuation system 200 is implemented on the pipe 102 during commissioning, and is coupled to the vent 114. In the illustrated example of FIG. 2, the vent 114 is fluidly coupled to the fluid evacuation system 200 instead of being open to the atmosphere. The example fluid evacuation system 200 compresses and/or evacuates a first fluid (e.g., air) from the pipe 102 so that a second fluid (e.g., gas) can be introduced to the pipe 102 without venting the second fluid.

As described in connection with FIG. 1 above, commissioning of the pipe 102 begins with sealing the pipe 102 at both ends by closing the first valve 104 and the second valve 106, then coupling the pipe 102 to a pipeline system. In the illustrated example of FIG. 2, the vent 114 is opened so that the air from the pipe 102 can enter the fluid evacuation system 200. Further, the gas supply 116 is coupled to the gas inlet 112 and an example pressure gauge 202 is coupled to the pipe 102. In the illustrated example of FIG. 2, the pressure gauge 202 is configured to measure a gauge pressure (e.g., atmospheric pressure) of the fluid inside the pipe 102. In some examples, the gauge pressure is measured in pounds per square inch gauge (psig). In other examples, the pressure gauge 202 can be configured to measure an absolute pressure of the fluid, where the absolute pressure can be measured in pounds per square inch absolute (psia). In other examples, a different unit of the gauge pressure and/or the absolute pressure can be used. Prior to commissioning and while the pipe 102 is filled with air from the atmosphere, the gauge pressure of the fluid inside the pipe is around 0 psig and the absolute pressure is around 14.7 psia.

In contrast to the commissioning procedure described in FIG. 1, an emission-less commissioning procedure is described in connection with FIG. 2. In FIG. 2, the gas supply 116 remains shut off to prevent gas from flowing to the pipe 102. The fluid evacuation system 200 is turned on and begins evacuating and/or compressing the air from the pipe 102 via the vent 114. In some examples, as the air is evacuated from the pipe 102, the gauge pressure measured by the pressure gauge 202 becomes negative and/or otherwise decreases. In some examples, the air evacuated by the fluid evacuation system 200 can be vented to the atmosphere and/or can be compressed and stored.

In response to the gauge pressure measured by the pressure gauge 202 reaching a negative pressure threshold (e.g., −13.9 psig, −14.4 psig, etc.), the fluid evacuation system 200 can be shut off and/or removed to prevent further evacuation of air. Further, the vent 114 can be closed to maintain the gauge pressure by preventing air from the atmosphere from re-entering the pipe 102. In some examples, the negative pressure threshold can be determined based on a desired final gauge pressure and/or desired concentration of gas in the pipe 102, as described in connection with FIGS. 4 and/or 5 below. In response to the fluid evacuation system 200 being shut off, the gas supply 116 can be turned on so that gas can flow into the pipe 102. In such examples, the gauge pressure measured by the pressure gauge 202 increases as more gas enters the pipe 102. In response to the gauge pressure reaching a desired final pressure in the pipe 102, the gas supply 116 can be shut off and/or removed from the gas inlet 112. In some examples, the first valve 104 and/or the second valve 106 can be opened to allow gas service to resume via the pipe 102. Advantageously, the emission-less commissioning procedure described in connection with FIG. 2 does not require venting of the gas from the pipe 102 to the atmosphere, thus reducing cost of the gas and reducing risk of accidental ignition of vented gas.

In the illustrated example of FIG. 2, an operator can manually turn on or shut off the fluid evacuation system 200 and/or the gas supply 116 (e.g., by using a switch, by opening or closing a control valve, etc.). In such examples, the operator reads the gauge pressure displayed on the pressure gauge 202 and, based on the gauge pressure, determines whether to turn on or shut off the fluid evacuation system 200 and/or the gas supply 116. In some examples, the fluid evacuation system 200, the pressure gauge 202, and/or the gas supply 116 can be communicatively coupled to a computer system (e.g., similar to the computer system 120 of FIG. 1) and/or another controller, processor, etc., and controllable via command signals sent from the computer system, controller, and/or processor, etc. For example, in the illustrated example of FIG. 2, the fluid evacuation system 200, the pressure gauge 202, and the gas supply 116 are communicatively coupled to example evacuation control circuitry 206. In some examples, the fluid evacuation system 200 and/or the gas supply 116 are controlled via the evacuation control circuitry 206 in addition to or instead of manual operation by an operator. The evacuation control circuitry 206 is described further in connection with FIG. 7 below.

In some examples, the fluid evacuation system 200 can be used to dry (e.g., remove moisture from) the pipe 102. In some examples, a hydrostatic test can be performed on the pipe 102 prior to commissioning. In such examples, the pipe 102 is filled with water to determine whether there are any defects (e.g., cracks, fractures, etc.) in the pipe 102. In response to completion of the hydrostatic test, the water is drained from the pipe 102 and the pipe 102 is dried prior to commissioning of the pipe 102. In some examples, the fluid evacuation system 200 can evacuate fluid (e.g., air and/or water) from the pipe 102 to accelerate the drying process. In such examples, the fluid evacuation system 200 reduces pressure in the pipe 102 and, in turn, increases an evaporation rate of the water. Advantageously, a time required to dry the pipe 102 is reduced using the fluid evacuation system 200 compared to using other drying methods (e.g., blowing hot air through the pipe 102, leaving the pipe 102 open to the atmosphere, etc.).

Figure 3A:
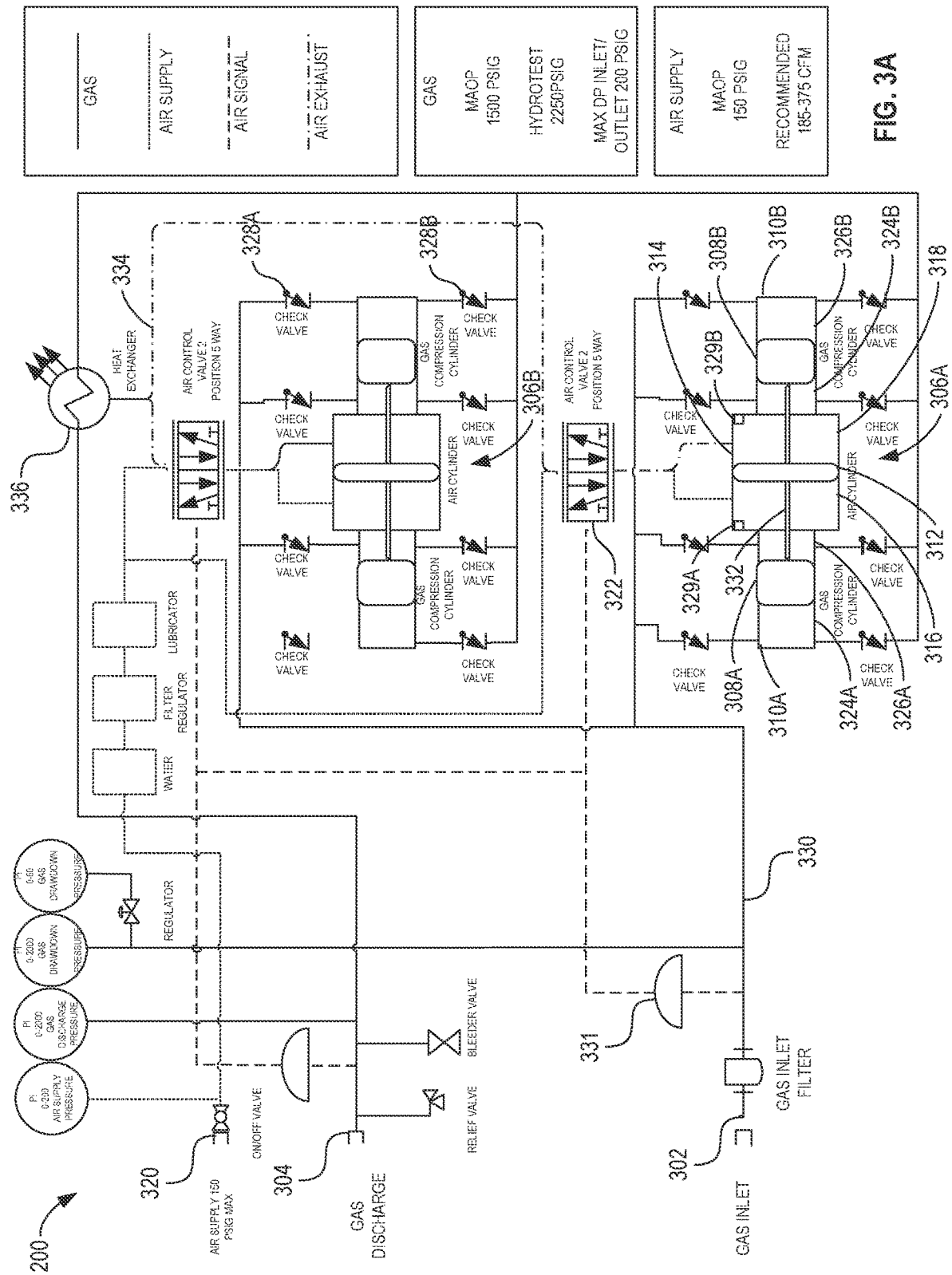
FIG. 3A is a schematic illustration of the example fluid evacuation system of FIG. 2.

FIG. 3A is a schematic illustration of the example fluid evacuation system 200 of FIG. 2. The example fluid evacuation system 200 is configured to transport fluid (e.g., air) from the pipe 102 of FIGS. 1 and/or 2 to a second location (e.g., the atmosphere). The example fluid evacuation system 200 includes an example fluid intake 302 coupled to the pipe 102 and an example fluid discharge 304 open to the atmosphere. Fluid is compressed by example compressor units 306A, 306B as the fluid flows from the fluid intake 302 to the fluid discharge 304. The compressor units 306A, 306B each include example compression pistons 308A, 308B implemented in example compression cylinders 310A, 310B, and an example air piston 312 implemented in an example air cylinder 314. The air cylinder 314 includes an example first chamber 316 and an example second chamber 318 coupled to an example air supply 320 via an example air control valve 322. The compression cylinders 310A, 310B include example third chambers 324A, 324B and example fourth chambers 326A, 326B coupled to the fluid intake 302 via inlet check valves 328A, and coupled to the fluid outlet via outlet check valves 328B.

In the illustrated example of FIG. 3A, fluid enters via the fluid intake 302 and flows to the compressor units 306A, 306B via example piping 330. The fluid enters the third chambers 324A, 324B and the fourth chambers 326A, 326B through the inlet check valves 328A. The inlet check valves 328A allow the fluid to flow unidirectionally from the fluid intake 302 to the compressor units 306A, 306B. The air control valve 322 also directs compressed air from the air supply 320 to enter the air cylinder 314. The air control valve 322 can alternate flow of the compressed air between the first chamber 316 and the second chamber 318. In the illustrated example of FIG. 3A, the air control valve 322 directs compressed air into the first chamber 316 in response to a first switch 329A being engaged, and directs compressed air into the second chamber 318 in response to a second switch 329B being engaged, where the first switch 329A and the second switch 329B are operatively coupled to the air control valve 322. In other examples, the air control valve 322 can switch a direction of flow of the compressed air based on a command and/or a signal from a computer and/or other processor communicatively coupled to the air control valve 322.

In the illustrated example of FIG. 3A, an under-pressure cutoff 331 is coupled to the piping 330 between the fluid intake 302 and the air control valve 322. In some examples, the under-pressure cutoff 331 can detect whether a pressure of the fluid in the piping 330 drops below a threshold pressure (e.g., cutoff pressure). In response to the under-pressure cutoff 331 determining that the pressure of the fluid has dropped below the cutoff pressure, the under-pressure cutoff 331 can send an air signal to the air control valve 322 to shut off the flow of compressed air into the compressor units 306A, 306B and, as such, prevent the compressor units 306A, 306B from further compressing the fluid. In examples disclosed herein, the under-pressure cutoff 331 is disabled (e.g., turned off) so that the compressor units 306A, 306B can continue to compress the fluid below the cutoff pressure. As such, disabling the under-pressure cutoff 331 allows the fluid in the pipe 102 to achieve a negative pressure, thereby creating a vacuum in the pipe 102.

In the illustrated example of FIG. 3A, in response to the air control valve 322 directing the compressed air to flow into the first chamber 316, the compressed air generates pressure on the air piston 312 to move the air piston 312 to the right (e.g., towards the second compression cylinder 310B). The air piston 312 is operatively coupled to the compression pistons 308A, 308B via an example rod 332, such that the compression pistons 308A, 308B move with the air piston 312. In response to the air piston 312 moving to the right and, thus, the compression pistons 308A, 308B moving to the right, the fluid in the fourth chambers 326A, 326B is compressed by the compression pistons 308A, 308B. Compressed fluid is expelled from the fourth chambers 326A, 326B and flows through the respective outlet check valves 328B towards the fluid discharge 304. The outlet check valves 328B allow the fluid to flow unidirectionally from the fluid intake 302 to the compressor units 306A, 306B.

In response to the air piston 312 being positioned to the right (in reference to the arrangement of FIG. 3A), the air piston 312 engages the second switch 329B coupled to the right side of the air cylinder 314. In response to the second switch 329B being engaged, the air control valve 322 stops the flow of compressed air to the first chamber 316 and directs the flow of compressed air to enter the second chamber 318. The compressed air from the first chamber 316 can be expelled to the atmosphere via air exhaust tubing 334. In some examples, the compressed air from the first chamber 316 can be used to cool the compressed fluid via an example heat exchanger 336 prior to the compressed air being expelled to the atmosphere.

In response to the air control valve 322 directed the flow of compressed air to enter the second chamber 318, the compressed air causes the air piston 312 and the compression pistons 308A, 308B to move to the left (e.g., toward the first compression cylinder 310A). The fluid in the third chambers 324A, 324B is compressed by the compression pistons 308A, 308B. The compressed fluid is expelled from the third chambers 324A, 324B and flows through the respective outlet check valves 328B towards the fluid discharge 304.

In response to the air piston 312 being positioned to the left (in reference to the arrangement of FIG. 3A), the air piston 312 engages the first switch 329A coupled to the left side of the air cylinder 314. In response to the first switch 329A being engaged, the air control valve 322 stops the flow of compressed air to the second chamber 318 and once again directs the flow of compressed air to enter the first chamber 316. In the illustrated example, the air control valve 322 continuously redirects the flow of compressed air between the first chamber 316 and the second chamber 318 to compress fluid entering the third chambers 324A, 324B and the fourth chambers 326A, 326B. The above process repeats until the pressure gauge 202 of FIG. 2 measures a gauge pressure of the fluid in the pipe 102 at or below a negative pressure threshold. In some examples, the evacuation control circuitry 206 of FIG. 2 obtains the gauge pressure from the pressure gauge 202 and controls operation of the fluid evacuation system 200 based on the gauge pressure.

Figure 3B:
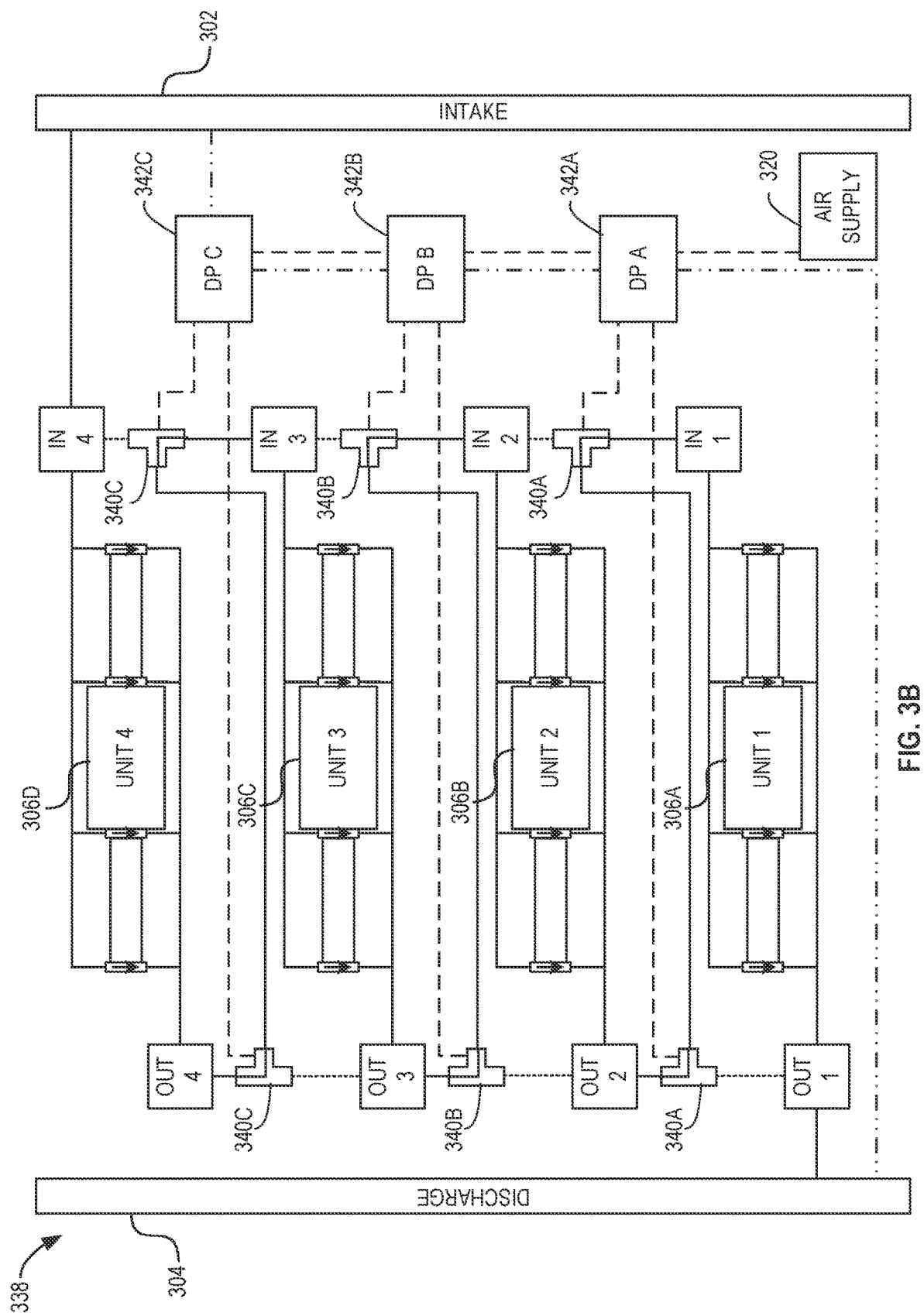
FIG. 3B is a schematic illustration of an example configurable fluid evacuation system with multiple ones of the compressor units of FIG. 3A.

FIG. 3B illustrates an example configurable fluid evacuation system 338 with multiple ones of the compressor units 306. In particular, the configurable fluid evacuation system 338 includes the first compressor unit 306A and the second compressor unit 306B of the fluid evacuation system 200 of FIGS. 2 and/or 3A, and further includes an example third compressor unit 306C and an example fourth compressor unit 306D. In the illustrated example of FIG. 3B, example control valves 340 are coupled between each pair of compressor units 306. For example, first control values 340A are coupled between the first compressor unit 306A and the second compressor unit 306B, second control valves 340B are coupled between the second compressor unit 306B and the third compressor unit 306C, and third control valves 340C are coupled between the third compressor unit 306C and the fourth compressor unit 306D. The control valves 340 are controllable via example differential pressure sensors 342, where a first differential pressure sensor 342A controls the first control valves 340A, a second differential pressure sensor 342B controls the second control valves 340B, and a third differential pressure sensor 342C controls the third control valves 340B. The differential pressure sensors 342 can measure a differential pressure between the fluid intake 302 and the fluid discharge 304 and, based on the differential pressure, can direct compressed air from the air supply 320 to the control valves 340 to switch the control valves 340 between a first state and a second state.

In the illustrated example, each pair of compressor units 306 can function in a parallel arrangement in response to the respective control valves 340 being in the first state, and can function in a series arrangement in response to the respective control valves 340 being in the second state. By switching the control valves 340 between the first state and the second state, a rate of compression and/or a differential pressure of the fluid between the fluid intake 302 and the fluid discharge 304 can be increased and/or decreased. For example, by replacing the fluid evacuation system 200 in FIG. 2 with the configurable fluid evacuation system 338, a rate of evacuation of air from the pipe 102 can be controlled by switching between the parallel arrangement and the series arrangement of the compressor units 306. In some examples, for the emission-less commissioning procedure described in connection with FIG. 2 above, the configurable fluid evacuation system 338 can be used in addition to or instead of the fluid evacuation system 200.

Figure 3C:
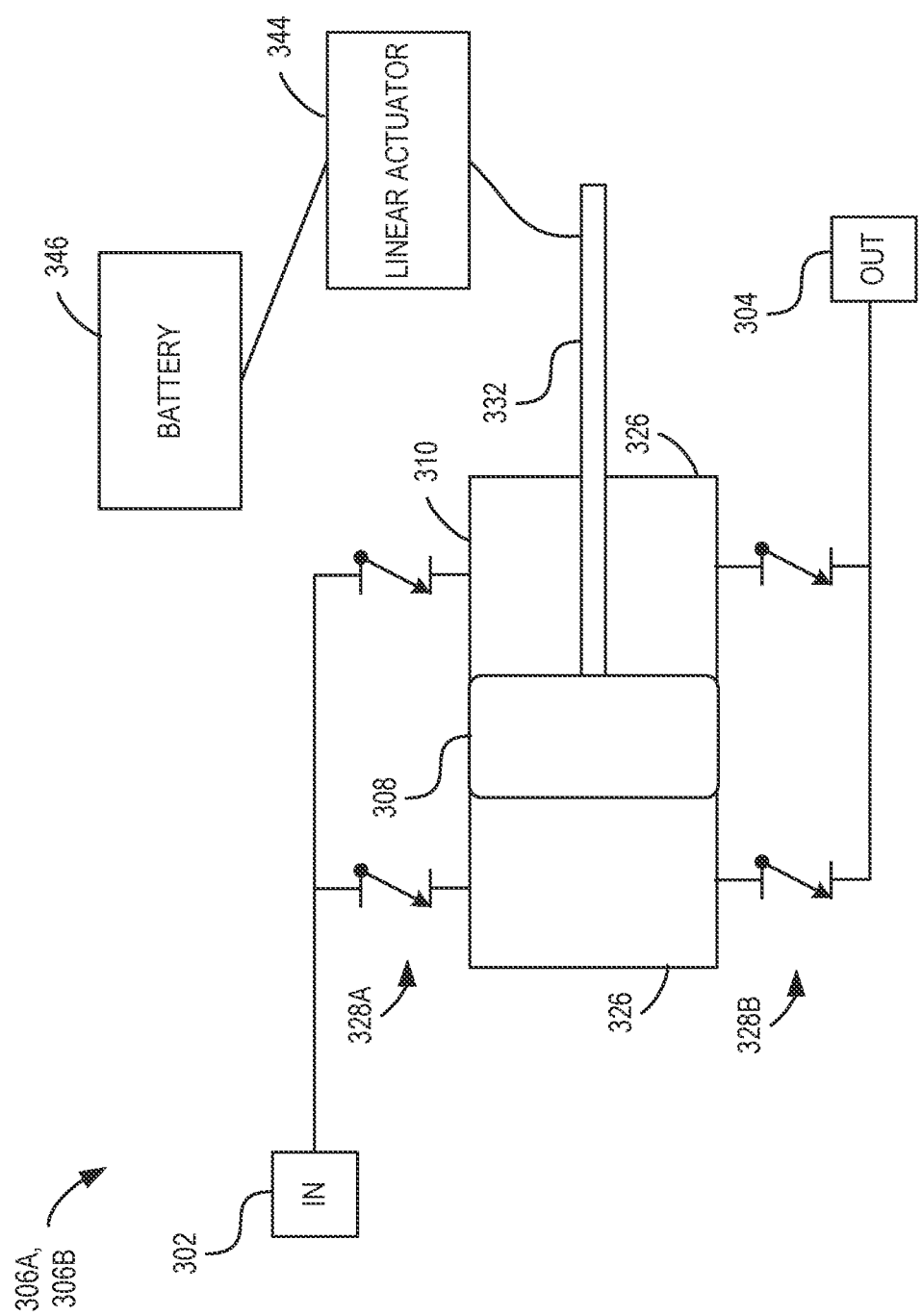
FIG. 3C illustrates the example compressor units of FIGS. 3A and/or 3B configured for electrical actuation.

FIG. 3C illustrates the compressor units 306A, 306B of FIGS. 3A and/or 3B configured for electrical, rather than pneumatic, actuation. In such examples, gas from the fluid intake 302 of FIG. 3A is not compressed using compressed air from the air supply 320, but rather is compressed via an example linear actuator 344. As such, in this example, the fluid evacuation system 200 does not include the air control valve 322, the air supply 320, and/or the air exhaust tubing 334 of FIG. 3A. The linear actuator 344 is coupled to and/or powered by an example battery 346.

In the illustrated example of FIG. 3C, the linear actuator 344 is operatively coupled to the rod 332 to move the gas piston 308 (e.g., the first gas piston 308A or the second gas piston 308B of FIG. 3A) inside the compression cylinder 310 (e.g., the first compression cylinder 310A or the second compression cylinder 310B of FIG. 3A). In this example, the linear actuator 344 is configured such that the gas piston 308 moves to the left in response to extension of the linear actuator 344, and the gas piston 308 moves to the right in response to contraction of the linear actuator 344. Alternatively, in other examples, the linear actuator 344 is configured such that the gas piston 308 moves to the left in response to contraction of the linear actuator 344, and the gas piston 308 moves to the right in response to extension of the linear actuator 344.

In this example, each of the compressor units 306A, 306B includes a single one of the gas pistons 308A, 308B and a corresponding one of the compression cylinders 310A, 310B. In such examples, each of the compressor units 306A, 306B includes corresponding ones of the linear actuator 344. In other examples, the linear actuator 344 can be coupled to both of the compressor units 306A, 306B to operate the compressor units 306A, 306B simultaneously. In other examples, the compressor units 306A, 306B can include both of the gas pistons 308A, 308B operated by the linear actuator 344.

In the illustrated example of FIG. 3C, in response to the linear actuator 344 moving the gas piston 308 to the right, the gas in the fourth chamber 326 is compressed by the gas piston 308. Compressed gas is expelled from the fourth chamber 326 and flows through the respective outlet check valves 328B towards the fluid discharge 304. Alternatively, in response to the linear actuator 344 moving the gas piston 308 to the left, the gas in the third chamber 324 is compressed by the gas piston 308. Compressed gas is expelled from the fourth chamber 326 and flows through the respective outlet check valves 328B towards the fluid discharge 304. In this example, the linear actuator 344 continuously moves between an extended position and a contracted position to compress gas entering the third chamber 324 and the fourth chamber 326 until the gas is evacuated from the first location (e.g., coupled to the fluid intake 302) and transferred to the second location (e.g., coupled to the fluid discharge 304).

Figure 3D:
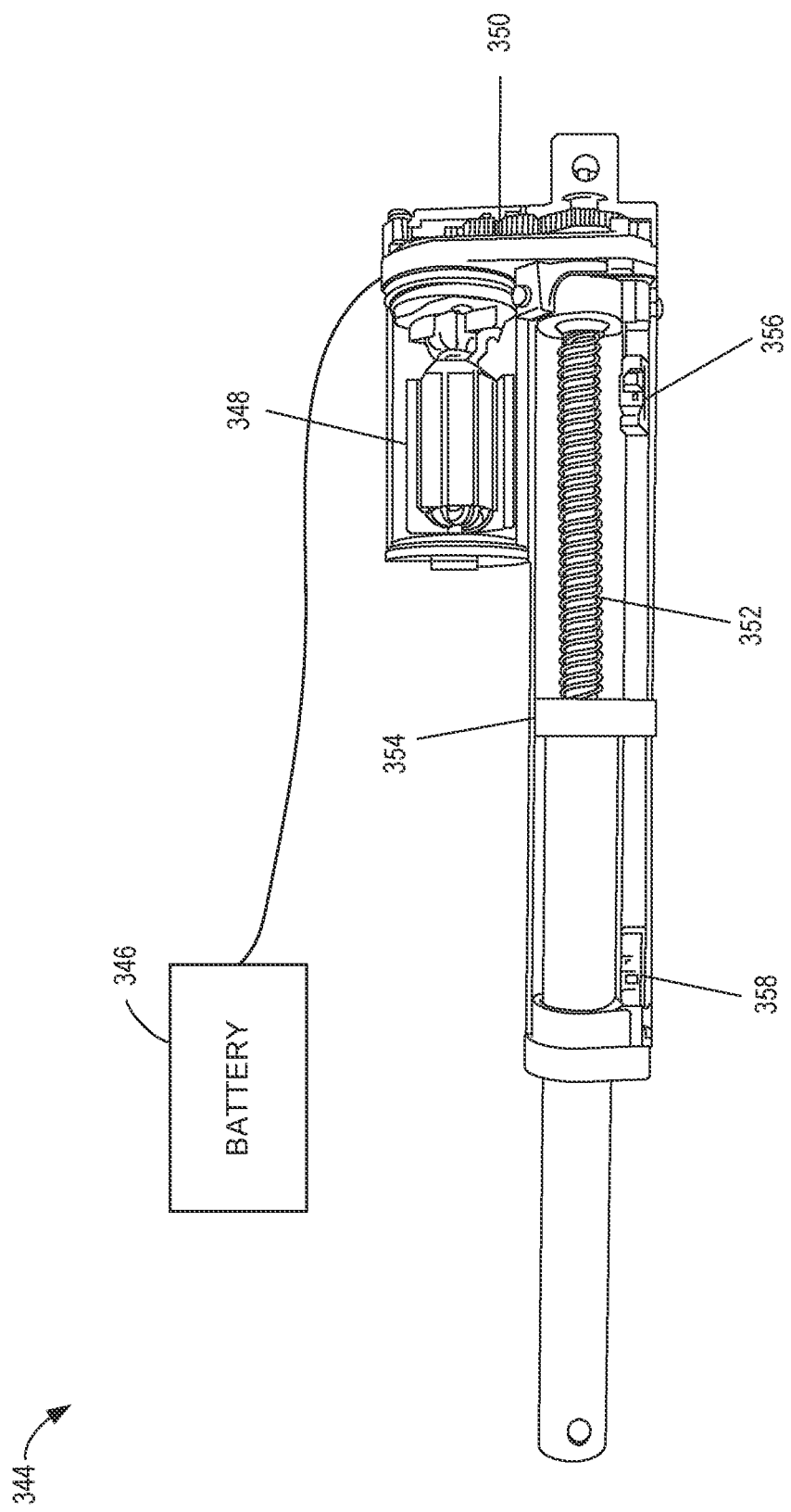
FIG. 3D illustrates a perspective view of the example linear actuator of FIG. 3C.

FIG. 3D illustrates a perspective view of the example linear actuator 344 of FIG. 3C. The example linear actuator 344 includes an example motor 348 coupled to the battery 346 of FIG. 3C, an example gear box 350, an example lead screw 352, an example drill nut 354, an example retract limit switch 356, and an example extend limit switch 358. In the illustrated example of FIG. 3D, rotation of the motor 348 causes corresponding rotation of the lead screw 352 via the gear box 350. The rotation of the lead screw 352 causes linear travel of the drill nut 354 along the lead screw 352 and, as such, causes the linear actuator 344 to extend or retract based on a direction of rotation of the motor 348 and/or the lead screw 352. For example, the linear actuator 344 extends in response to the motor 348 rotating in a first direction, and the linear actuator 344 retracts in response to the motor 348 rotating in a second direction, where the second direction is opposite from the first direction.

In the illustrated example of FIG. 3D, in response to the linear actuator 344 being fully extended, the drill nut 354 engages the extend limit switch 358. In such examples, the extend limit switch 358 sends a first electrical signal to the motor 348. In some examples, the first electrical signal causes the motor 348 to stop rotating and/or reverse the direction of rotation (e.g., from the first direction to the second direction). Alternatively, in response to the linear actuator 344 being fully retracted, the drill nut 354 engages the retract limit switch 356. In such examples, the retract limit switch 356 sends a second electrical signal to the motor 348. In some examples, where the first electrical signal causes the motor 348 to stop rotating and/or reverse the direction of rotation (e.g., from the second direction to the first direction). As such, repeatedly engaging the retract limit switch 356 and the extend limit switch 358 causes linear reciprocal travel of the linear actuator 344 to compress the gas in the compression cylinder 310 of FIG. 3C.

FIG. 4 illustrates an example table 400 used to determine a negative pressure threshold (e.g., a first threshold) for an emission-less commissioning procedure described in connection with FIG. 2 above. In some examples, the table 400 is generated by and/or stored in the example evacuation control circuitry 206 of FIG. 2. In the illustrated example of FIG. 4, the table 400 includes a first column 402 corresponding to time (e.g., in minutes, in hours, etc.), a second column 404 corresponding to gauge pressure (e.g., atmospheric pressure), in psig, of the fluid in the pipe 102, a third column 406 corresponding to absolute pressure, in psia, of the fluid, a fourth column 408 corresponding to percentage of air remaining (e.g., air concentration) in the pipe 102, a fifth column 410 corresponding to a first gas percentage (e.g., gas concentration) to refill the pipe 102 to 0 psig, and a sixth column 412 corresponding to a second gas percentage to refill the pipe 102 to 12 psig. In the illustrated example of FIG. 4, the pipe 102 is refilled to the desired final pressure (e.g., final pressure threshold, second threshold) of 12 psig. In other examples, a value of the desired final pressure can be different based on the pipeline system on which the pipe 102 is implemented.

In the example table 400, the first column 402 indicates the length of time passed relative to a start time at which the fluid evacuation system 200 begins operation (e.g., begins evacuating air from the pipe 102). For example, each row of the table 400 indicates the gauge pressure (e.g., in the second column 404), the absolute pressure (e.g., in the third column 406), and the air concentration of the fluid (e.g., in the fourth column 408) corresponding to the time indicated by the first column 402. The fifth column 410 and the sixth column 412 indicate a gas concentration of the fluid in response to refilling the pipe to a gauge pressure of 0 psig and 12 psig, respectively. In the illustrated example of FIG. 4, the absolute pressure of the fluid (e.g., shown in the third column 406) decreases by 10% per minute during operation of the fluid evacuation system 200.

In the illustrated example of FIG. 4, the fluid in the pipe 102 begins at normal atmospheric pressure, where the fluid has a gauge pressure of 0 psig and an absolute pressure of 14.7 psia (e.g., shown in an example row A 400A). In example row B 400B of the table 400, the absolute pressure of the fluid shown in the third column 406 decreases by 10% to 13.23 psia after the fluid evacuation system 200 has been evacuating air from the pipe 102 for 1 minute. At the 1-minute mark, the corresponding gauge pressure shown in the second column 402 is −1.47 psig, where the gauge pressure can be calculated using Equation 1 below based on the corresponding absolute pressure in the third column 406 (e.g., by subtracting 14.7 psig from the corresponding absolute pressure).

$$P_{gauge} = P_{absolute} - 14.7 \qquad \text{Equation 1:}$$

In Equation 1 above, $P_{gauge}$ represents the gauge pressure and $P_{absolute}$ refers to the absolute pressure of the fluid in the pipe 102. The air concentration (e.g., shown in the fourth column 408) is a ratio of the absolute pressure to the normal absolute pressure at the 1-minute mark. For example, the air concentration at the 1-minute mark is 90%, which can be found using Equation 2 below by dividing the absolute pressure of 13.23 psia by the normal absolute pressure of 14.7 psia.

$$C_{air} = (P_{absolute}/14.7) * 100\% \qquad \text{Equation 2:}$$

In Equation 2 above, $C_{air}$ represents the air concentration of the fluid in the pipe 102. In response to the fluid evacuation system 200 being shut off (e.g., the air is no longer being evacuated from the pipe 102), the gas supply 116 of FIG. 2 can be turned on to supply gas to the pipe 102. In some examples, the gas supply 116 can supply air to the pipe 102 until the pressure gauge 202 reaches a starting gauge pressure of 0 psig, or until the pressure gauge 202 reaches the desired final pressure of 12 psig. For example, in response to the fluid evacuation system 200 being shut off at the 1-minute mark and the gas supply 116 supplying gas to the pipe until gauge pressure is at 0 psig, the fluid in the pipe is 10% gas (e.g., shown in the fifth column 410 of the row B 400B), where the gas concentration at 0 psig is found using Equation 3 below.

$$C_{gas,0} = 100\% - C_{air} \qquad \text{Equation 3:}$$

In Equation 3 above, $C_{gas,0}$ represents the gas concentration of the fluid in the pipe 102 when refilled to a gauge pressure of 0 psig. In some examples, the gas supply 116 can continue to supply gas to the pipe 102 until the fluid in the pipe 102 reaches the desired final pressure of 12 psig. In such examples, the fluid in the pipe 102 at the desired final pressure is 50% gas (e.g., shown in the sixth column 412 of the row B 400B), where the gas concentration at 12 psig is found using Equation 3 below.

$$C_{gas,12} = \left(\frac{12}{14.7} + C_{air}\right) / \left(\frac{12}{14.7} + 1\right) * 100\% \qquad \text{Equation 4}$$

In Equation 4 above, $C_{gas,12}$ represents the gas concentration of the fluid in the pipe 102 when refilled to a gauge pressure of 12 psig. Based on the example table 400, to achieve a similar gas concentration of 50% at a gauge pressure of 0 psig, air from the pipe 102 must be evacuated by the fluid evacuation system 200 for between 6 and 7 minutes before the gas supply 116 can supply the gas (e.g., shown in an example row G 400G and an example row H 400H of table 400).

In some examples, pipelines are typically pressurized to a final pressure that is substantially greater than the normal atmospheric pressure of 0 psig. Advantageously, the amount of air that must be evacuated by the fluid evacuation system 200 and the time required to evacuate the air is reduced in response to an increase in the final pressure of the fluid. Additionally, the fluid in the pipe 102 must have a specific gas concentration (e.g., gas percentage) before the pipe 102 can be put into service. In some examples, the fluid must be 95% gas, 90% gas, etc. The example table 400 can be used to determine the time required by the fluid evacuation system 200 to evacuate the air from the pipe 102, and/or to determine a negative gauge pressure at which the fluid evacuation system 200 is shut off. A process to determine the time required and/or the negative gauge pressure is described below in connection with FIG. 5. In some examples, the values in the table 400 can be different based on a rate of evacuation of air from the pipe 102 and/or the desired final pressure of the fluid.

Figure 5:
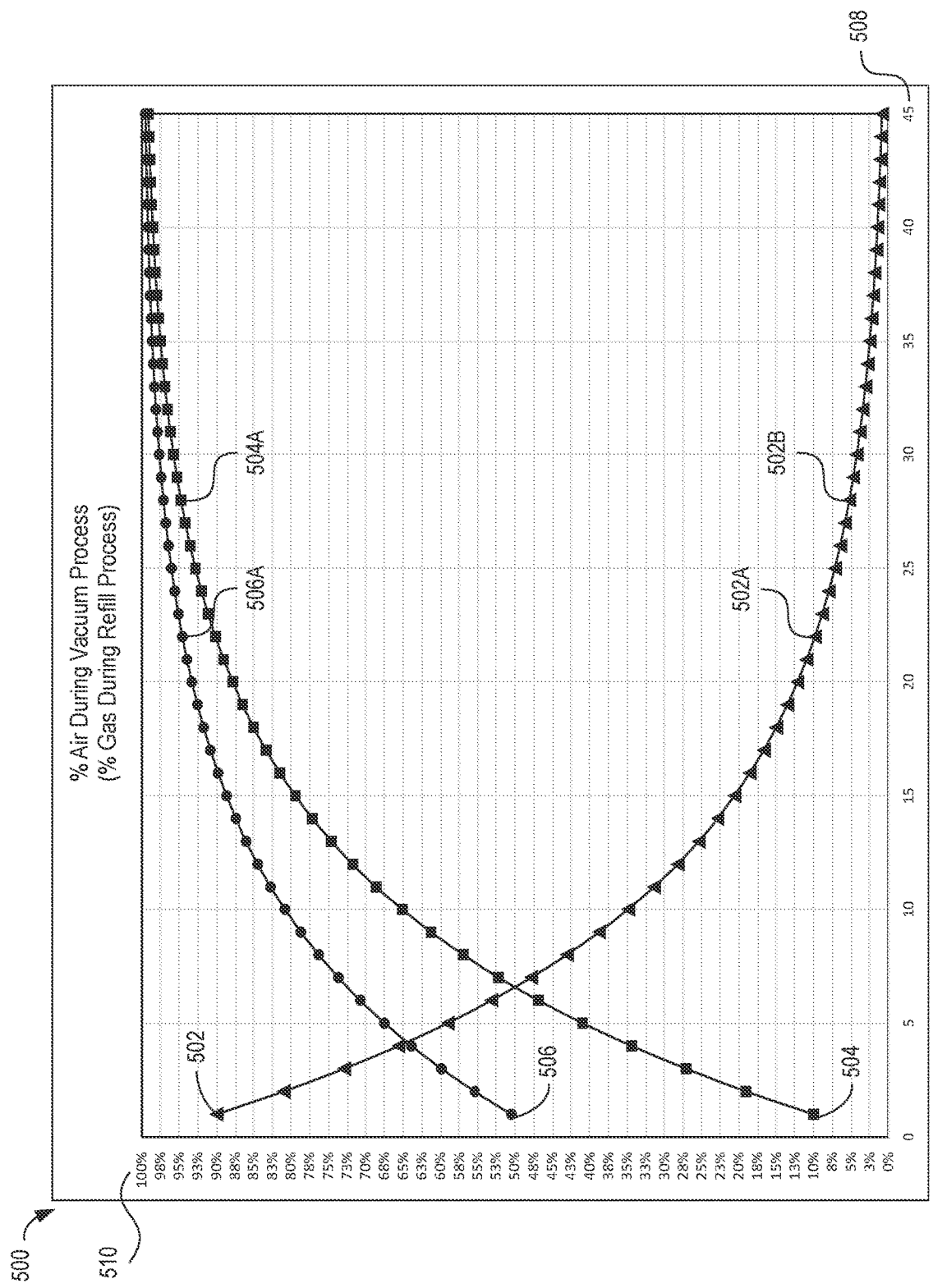
FIG. 5 illustrates example plots corresponding to values from the example table of FIG. 4.

FIG. 5 illustrates example plots 500 corresponding to the example table 400 of FIG. 4. The example plots 500 include an example first plot 502, an example second plot 504, and an example third plot 506. The example first plot 502 represents air concentration in the pipe 102 during an evacuation process, corresponding to the fourth column 408 of FIG. 4. The example second plot 504 represents first gas concentrations of the fluid corresponding to the fifth column 410 of FIG. 4, where the pipe 102 is refilled to a final pressure of 0 psig. The example third plot 506 represents second gas concentrations of the fluid corresponding to the sixth column 412 of FIG. 4, where the pipe 102 is refilled to a final pressure of 12 psig. The example plots 500 include an example horizontal axis 508 representing time (e.g., in minutes) relative to a start of the evacuation process, and an example vertical axis 510 representing concentration (e.g., of air and/or gas).

The example plots 500 of FIG. 5, in conjunction with the table 400, can be used by an operator to determine how long the example fluid evacuation system 200 of FIG. 2 is to evacuate air from the pipe 102 and/or can be used to determine a gauge pressure at which the fluid evacuation system 200 can be shut off. In one example, fluid in the pipe 102 must be pressurized to 12 psig and a gas concentration of 95% prior to resuming gas service in the pipe 102. In such an example, a first point 506A is selected on the third plot 506 corresponding to a gas concentration of 95% on the vertical axis 510, and further corresponding to a time of 22 minutes on the horizontal axis 508. A second point 502A is selected on the first plot 502 corresponding to the same time of 22 minutes on the horizontal axis 508. The second point 502A further corresponds to a percentage (e.g., air concentration) of 10% on the vertical axis 510. As such, to refill the pipe 102 to a gas concentration of 95% and a gauge pressure of 12 psig, the fluid evacuation system 200 must evacuate air from the pipe 102 for 22 minutes to an air concentration of 10%.

Alternatively, to refill the pipe to a gas concentration of 95% and a gauge pressure of 0 psig, a third point 504A can be selected on the second plot 504. In such examples, the third point 504A corresponds to a gas concentration of 95% on the vertical axis 510, and further corresponds to a time of 28 minutes on the horizontal axis 508. Accordingly, a fourth point 502B can be selected on the first plot 502 corresponding to the same time of 28 minutes on the horizontal axis 508. The fourth point 502B further corresponds to an air concentration of 5% on the vertical axis 510. Accordingly, to refill the pipe 102 to a gas concentration of 95% and a gauge pressure of 0 psig, the fluid evacuation system 200 must evacuate air from the pipe 102 for 28 minutes to an air concentration of 5%. In the illustrated example of FIG. 5, refilling the pipe 102 to a higher gas concentration (e.g., to 12 psig instead of 0 psig) reduces the time required for evacuation by 6 minutes and reduces the amount of air evacuated by 5%.

In some examples, the plots 500 and/or the table 400 can be used to determine the gauge pressure at which the fluid evacuation system 200 can be shut off and/or removed from the pipe 102. For example, the first point 506A and/or the second point 502A correspond to example row N 400N of the table 400, and the third point 504A and the fourth point 502B correspond to example row T 400T. Based on row N 400N, to refill the pipe 102 to a gauge pressure of 12 psig and a gas concentration of 95%, the fluid evacuation system 200 can be shut off and/or removed in response to the pressure gauge 202 measuring a gauge pressure of −13.25 psig. Based on row T 400T, to refill the pipe 102 to a gauge pressure of 0 psig and a gas concentration of 95%, the fluid evacuation system 200 can be shut off and/or removed in response to the pressure gauge 202 measuring a gauge pressure of −13.93 psig.

Figure 6:
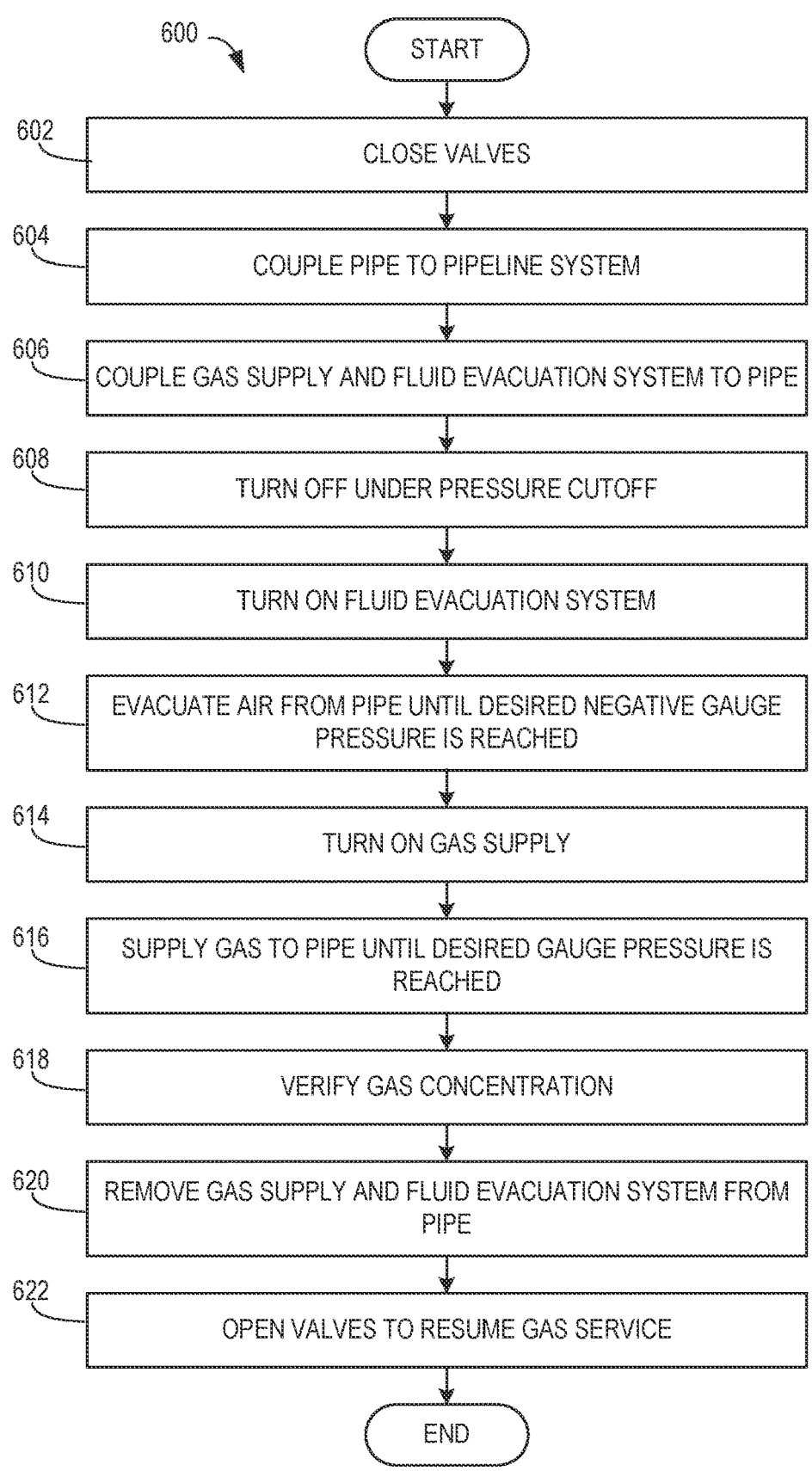
FIG. 6 is a flowchart representative of instructions which may be executed to implement the emission-less commissioning procedure as described in connection with FIG. 2.

FIG. 6 is a flowchart representative of instructions 600 which may be executed to implement the emission-less commissioning procedure on the pipe 102 as described in connection with FIG. 2. The instructions 600 begin as the pipe 102 is open to and/or filled with air from the atmosphere.

At block 602, valves (e.g., the first valve 104 and the second valve 106 of FIGS. 1 and/or 2) at each end of the pipe 102 are closed. For example, an operator manually closes the first valve 104 and the second valve 106 so that fluid (e.g., gas, air) is prevented from entering or exiting the pipe 102 from the first end 108 and/or the second end 110. In some examples, the first valve 104 and the second valve 106 can be electrically controlled (e.g., opened or closed) via a command signal sent from a computer system, controller, and/or other processor coupled to the first valve 104 and the second valve 106.

At block 604, the pipe 102 is coupled to a pipeline system. For example, the pipe 102 can be welded and/or otherwise fluidly coupled to the pipeline system so that gas from the pipeline system can flow through the pipe 102 while the pipeline system is in service. During commissioning of the pipe 102, gas service in the pipeline system is temporarily suspended.

At block 606, the gas supply 116 of FIGS. 1 and/or 2 and the fluid evacuation system 200 of FIG. 2 are coupled to the pipe 102. For example, the gas supply 116 is fluidly coupled to the gas inlet 112 of FIGS. 1 and/or 2 so that gas can flow from the gas supply 116 to the pipe 102 while the gas supply 116 is turned on. Further, the fluid evacuation system 200 is fluidly coupled to the vent 114 of FIGS. 1 and/or 2 so that air can flow from the pipe 102 to the fluid evacuation system 200 while the fluid evacuation system 200 is turned on. Both the gas supply 116 and the fluid evacuation system 200 remain turned off upon being coupled to the pipe 102.

At block 608, the under-pressure cutoff 331 of FIG. 3A is turned off. For example, an operator turns of the under-pressure cutoff 331 on the fluid evacuation system 200 so that the fluid evacuation system 200 can continue operating at negative gauge pressure (e.g., gauge pressure below 0 psig).

At block 610, the fluid evacuation system 200 is turned on. For example, the operator turns on the fluid evacuation system 200 so that the fluid evacuation system 200 can begin compressing and/or evacuating air from the pipe 102 and releasing the air to the atmosphere.

At block 612, the fluid evacuation system 200 evacuates the air from the pipe 102 until a desired negative gauge pressure is reached. For example, in response to the pressure gauge 202 of FIG. 2 measuring a gauge pressure of the fluid in the pipe that is at or below the desired negative gauge pressure, the operator can shut off the fluid evacuation system 200 so that so that air is no longer being evacuated from the pipe 102. In some examples, the desired negative gauge pressure is selected based on the table 400 of FIG. 4 and/or the plots 500 of FIG. 5.

At block 614, the gas supply 116 is turned on. For example, the operator turns on the gas supply 116 so that the gas can flow from the gas supply 116 into the pipe 102.

At block 616, the gas supply 116 supplies gas to the pipe 102 until a desired gauge pressure is reached. For example, in response to the pressure gauge 202 of FIG. 2 measuring a gauge pressure of the fluid in the pipe that is at or above the desired gauge pressure, the operator can shut off the gas supply 116 so that so that gas is no longer flowing into the pipe 102. In some examples, the desired gauge pressure is selected based on the table 400 and/or the plots 500.

At block 618, the operator verifies whether the gas in the pipe 102 is at a desired concentration. For example, the operator can couple the gas meter 118 of FIG. 1 to the vent 114 and measure the gas concentration using the gas meter 118. In some examples, the gas supply 116 further pumps gas into the pipe 102 until the desired concentration of the gas is reached.

At block 620, the gas supply 116 and/or the fluid evacuation system 200 are removed from the pipe 102. For example, the operator removes the gas supply 116 from the gas inlet 112 and removes the fluid evacuation system 200 from the vent 114. In such examples, the gas inlet 112 and the vent 114 are closed to prevent fluid from entering and/or exiting the pipe 102 via the gas inlet 112 and/or the vent 114.

At block 622, the first valve 104 and the second valve 106 are opened so that gas service may resume through the pipeline system and/or through the pipe 102. For example, the operator manually opens the first valve 104 and the second valve 106 so that fluid can flow between the first end 108 and the second end 110 of the pipe 102. The process ends.

Figure 7:
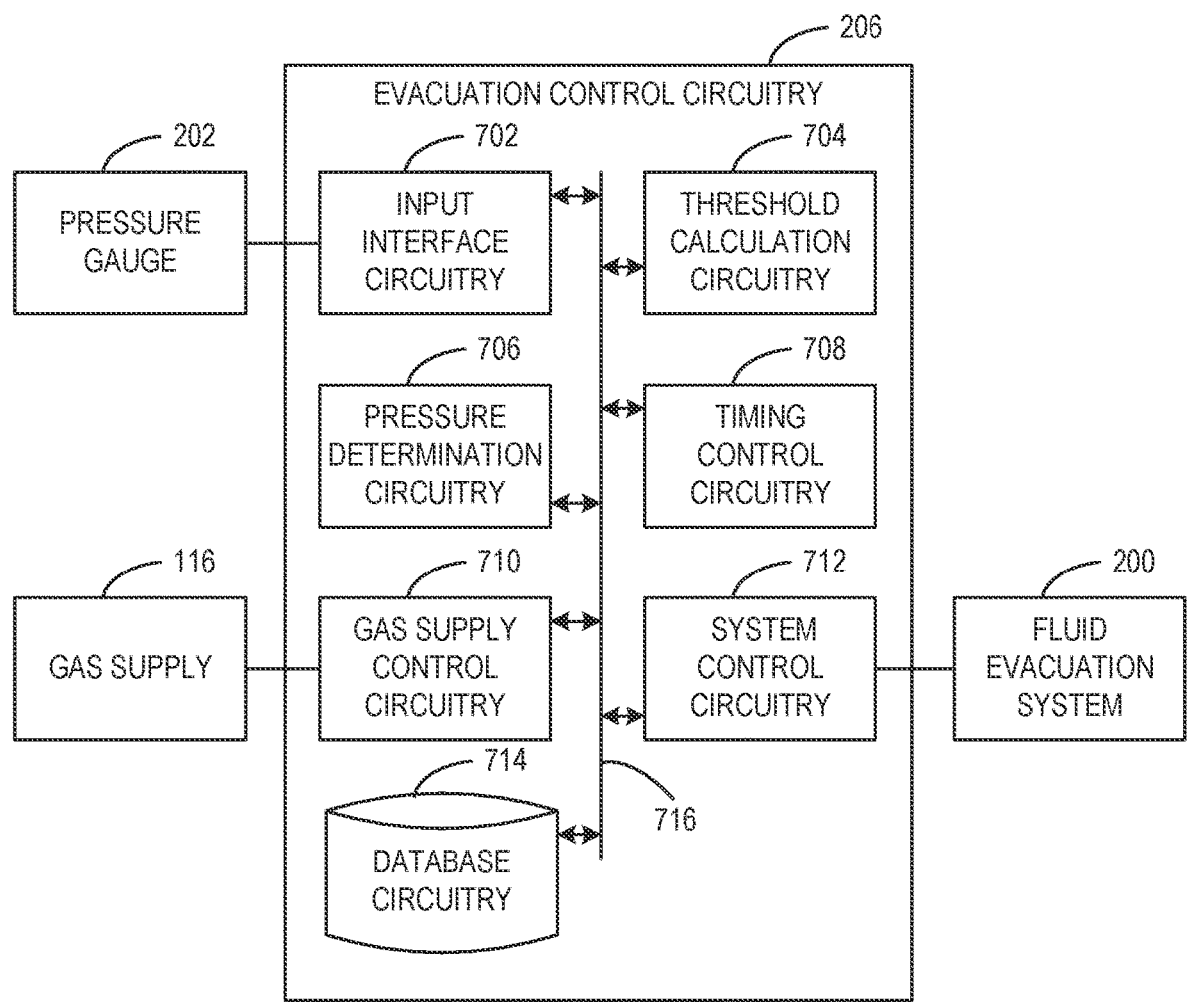
FIG. 7 is a block diagram of the example evacuation control circuitry of FIG. 2.

FIG. 7 is a block diagram of the example evacuation control circuitry 206 of FIG. 2. In the illustrated example of FIG. 7, the evacuation control circuitry 206 includes example input interface circuitry 702 communicatively coupled to the pressure gauge 202, example threshold calculation circuitry 704, example pressure determination circuitry 706, example timing control circuitry 708, example gas supply control circuitry 710 coupled to the gas supply 116, example system control circuitry 712 coupled to the fluid evacuation system 200, and example database circuitry 714. In the illustrated example of FIG. 7, any of the input interface circuitry 702, the threshold calculation circuitry 704, the pressure determination circuitry 706, the timing control circuitry 708, the gas supply control circuitry 710, the system control circuitry 712, and/or the database circuitry 714 can communicate via an example communication bus 716.

In examples disclosed herein, the communication bus 716 may be implemented using any suitable wired and/or wireless communication. In additional or alternative examples, the communication bus 716 includes software, machine readable instructions, and/or communication protocols by which information is communicated among the input interface circuitry 702, the threshold calculation circuitry 704, the pressure determination circuitry 706, the timing control circuitry 708, the gas supply control circuitry 710, the system control circuitry 712, and/or the database circuitry 714.

In the illustrated example of FIG. 7, the database circuitry 714 stores data utilized and/or obtained by the evacuation control circuitry 206. In some examples, the database circuitry 714 stores one or more tables (e.g., the example table 400 of FIG. 4) for use in determining one or more thresholds. The example database circuitry 714 of FIG. 7 is implemented by any memory, storage device and/or storage disc for storing data such as, for example, flash memory, magnetic media, optical media, solid state memory, hard drive(s), thumb drive(s), etc. Furthermore, the data stored in the example database circuitry 714 may be in any data format such as, for example, binary data, comma delimited data, tab delimited data, structured query language (SQL) structures, etc. While, in the illustrated example, the example database circuitry 714 is illustrated as a single device, the example database circuitry 714 and/or any other data storage devices described herein may be implemented by any number and/or type(s) of memories.

The example input interface circuitry 702 obtains measurement data from the pressure gauge 202. For example, the input interface circuitry 702 obtains a gauge pressure (e.g., in psig) and/or an absolute pressure (e.g., in psia) of fluid inside the pipe 102 of FIG. 2. In some examples, the gas supply control circuitry 710 and the system control circuitry 712 control the gas supply 116 and the fluid evacuation system 200, respectively, based on the gauge pressure and/or the absolute pressure in the pipe 102. In some examples, the input interface circuitry 702 provides the gauge pressure and/or the absolute pressure to the database circuitry 714 for storage therein.

The example threshold calculation circuitry 704 calculates one or more thresholds based on a desired gas concentration in the pipe 102. In some examples, the desired gas concentration is preloaded in the threshold calculation circuitry 704 and/or can be selected and/or modified via user input. In some examples, the threshold calculation circuitry 704 determines the one or more thresholds based on the example table 400 of FIG. 4 and/or the example plot 500 of FIG. 5. For example, based on the table 400 and/or the plot 500, the threshold calculation circuitry 704 determines the negative pressure threshold at which the fluid evacuation system 200 is to be shut off and the gas supply 116 is to be turned on. Furthermore, based on the table 400 and/or the plot 500, the threshold calculation circuitry 704 determines the final pressure threshold at which the gas supply 116 is to be shut off to obtain the desired gas concentration in the pipe 102. Additionally or alternatively, the threshold calculation circuitry 704 determines a first threshold duration (e.g., a first length of time) for which the fluid evacuation system 200 is to operate for the fluid in the pipe 102 to reach the negative pressure threshold, and determines a second threshold duration (e.g., a second length of time) for which the gas supply 116 is to operate for the fluid in the pipe 102 to reach the final pressure threshold. In some examples, the table 400 and/or the plot 500 are preloaded and/or stored in the database circuitry 714.

The example pressure determination circuitry 706 determines whether a measured pressure (e.g., the measured gauge pressure and/or the measured absolute pressure) in the pipe 102 satisfies the negative pressure threshold and/or the final pressure threshold. For example, during operation of the fluid evacuation system 200, the pressure determination circuitry 706 compares the measured pressure to the negative pressure threshold. In some examples, the pressure determination circuitry 706 determines that the fluid evacuation system 200 is to be shut off when the measured pressure satisfies the negative pressure threshold. Additionally or alternatively, during operation of the gas supply 116, the pressure determination circuitry 706 compares the measured pressure to the final pressure threshold. In such examples, the pressure determination circuitry 706 determines that the gas supply 116 is to be shut off when the measured pressure satisfies the final pressure threshold. In some examples, when the measured pressure satisfies the negative pressure threshold, the pressure determination circuitry 706 directs the system control circuitry 712 to shut off the fluid evacuation system 200 and directs the gas supply control circuitry 710 to turn on the gas supply 116. In some examples, when the measured pressure satisfies the final pressure threshold, the pressure determination circuitry 706 directs the gas supply control circuitry 710 shut off the gas supply 116.

The example timing control circuitry 708 determines a first duration for which the fluid evacuation system 200 evacuates first fluid from the pipe 102 and determines a second duration for which the gas supply 116 supplies second fluid to the pipe 102. In some examples, during operation for the fluid evacuation system 200, the timing control circuitry 708 compares the first duration to the first threshold duration. In some examples, the timing control circuitry 708 determines that the fluid evacuation system 200 is to be shut off when the first duration satisfies the first threshold duration. Additionally or alternatively, during operation of the gas supply 116, the timing control circuitry 708 compares the second duration to the second threshold duration. In such examples, the timing control circuitry 708 determines that the gas supply 116 is to be shut off when the first duration satisfies the second threshold duration. In some examples, when the first duration satisfies the first threshold duration, timing control circuitry 708 directs the system control circuitry 712 to shut off the fluid evacuation system 200 and directs the gas supply control circuitry 710 to turn on the gas supply 116. In some examples, when the second duration satisfies the second threshold duration, the timing control circuitry 708 directs the gas supply control circuitry 710 shut off the gas supply 116.

The example gas supply control circuitry 710 controls operation of the gas supply 116. For example, the gas supply control circuitry 710 can turn on the gas supply 116 to enable flow of gas therefrom to the pipe 102, and can shut off the gas supply 116 to restrict and/or otherwise prevent the flow of gas therefrom. In some examples, the gas supply control circuitry 710 turns on the gas supply 116 when the pressure determination circuitry 706 determines that the measured pressure in the pipe 102 satisfies the negative pressure threshold and/or the timing control circuitry 708 determines that the first duration satisfies the first threshold duration. In some examples, the gas supply control circuitry 710 shuts off the gas supply 116 when the pressure determination circuitry 706 determines that the measured pressure in the pipe 102 satisfies the final pressure threshold and/or the timing control circuitry 708 determines that the second duration satisfies the second threshold duration. In some examples, the gas supply control circuitry 710 can control a flow rate of gas from the gas supply 116.

The example system control circuitry 712 controls operation of the fluid evacuation system 200. For example, the system control circuitry 712 can turn on the fluid evacuation system 200 to compress and/or otherwise evacuate air from the pipe 102, and can shut off the fluid evacuation system 200 to stop the evacuation and/or compression of air. In some examples, when the fluid evacuation system 200 is coupled to the pipe 102, the system control circuitry 712 turns on the fluid evacuation system 200 to begin evacuation of the air from the pipe 102. In some examples, the system control circuitry 712 shuts off the fluid evacuation system 200 when the pressure determination circuitry 706 determines that the measured pressure in the pipe 102 satisfies the negative pressure threshold and/or the timing control circuitry 708 determines that the first duration satisfies the first threshold duration. In some examples, the system control circuitry 712 can control a flow rate and/or a differential pressure of the air through the fluid evacuation system 200. For example, the system control circuitry 712 may be operatively coupled to the control valves 340 of FIG. 3B. In some such examples, the control valves 340 are electrically actuated such that the system control circuitry 712 can switch, via electrical signals, the control valves 340 between first and second states. As such, the system control circuitry 712 can switch the compressor units 306A, 306B, 306C, 306D between series and parallel configurations to control the flow rate and/or the differential pressure therethrough.

In some examples, the fluid evacuation system 200 implements means for evacuating first fluid, the gas supply 116 implements means for supplying second fluid, the pressure gauge 202 implements means for measuring, the evacuation control circuitry 206 implements means for controlling, and the compressor units 306A, 306B, 306C, 306D implement means for compressing.

While an example manner of implementing the evacuation control circuitry 206 of FIG. 2 is illustrated in FIG. 7, one or more of the elements, processes, and/or devices illustrated in FIG. 4 may be combined, divided, re-arranged, omitted, eliminated, and/or implemented in any other way. Further, the example input interface circuitry 702, the example threshold calculation circuitry 704, the example pressure determination circuitry 706, the example timing control circuitry 708, the example gas supply control circuitry 710, the example system control circuitry 712, the example database circuitry 714, and/or, more generally, the example evacuation control circuitry 206 of FIG. 7, may be implemented by hardware, software, firmware, and/or any combination of hardware, software, and/or firmware. Thus, for example, any of the example input interface circuitry 702, the example threshold calculation circuitry 704, the example pressure determination circuitry 706, the example timing control circuitry 708, the example gas supply control circuitry 710, the example system control circuitry 712, the example database circuitry 714, and/or, more generally, the example evacuation control circuitry 206, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input interface circuitry 702, the example threshold calculation circuitry 704, the example pressure determination circuitry 706, the example timing control circuitry 708, the example gas supply control circuitry 710, the example system control circuitry 712, and/or the example database circuitry 714 is/are hereby expressly defined to include a non-transitory computer readable storage device or storage disk such as a memory, a digital versatile disk (DVD), a compact disk (CD), a Blu-ray disk, etc., including the software and/or firmware. Further still, the example evacuation control circuitry 206 of FIG. 2 may include one or more elements, processes, and/or devices in addition to, or instead of, those illustrated in FIG. 7, and/or may include more than one of any or all of the illustrated elements, processes and devices.

Figure 8:
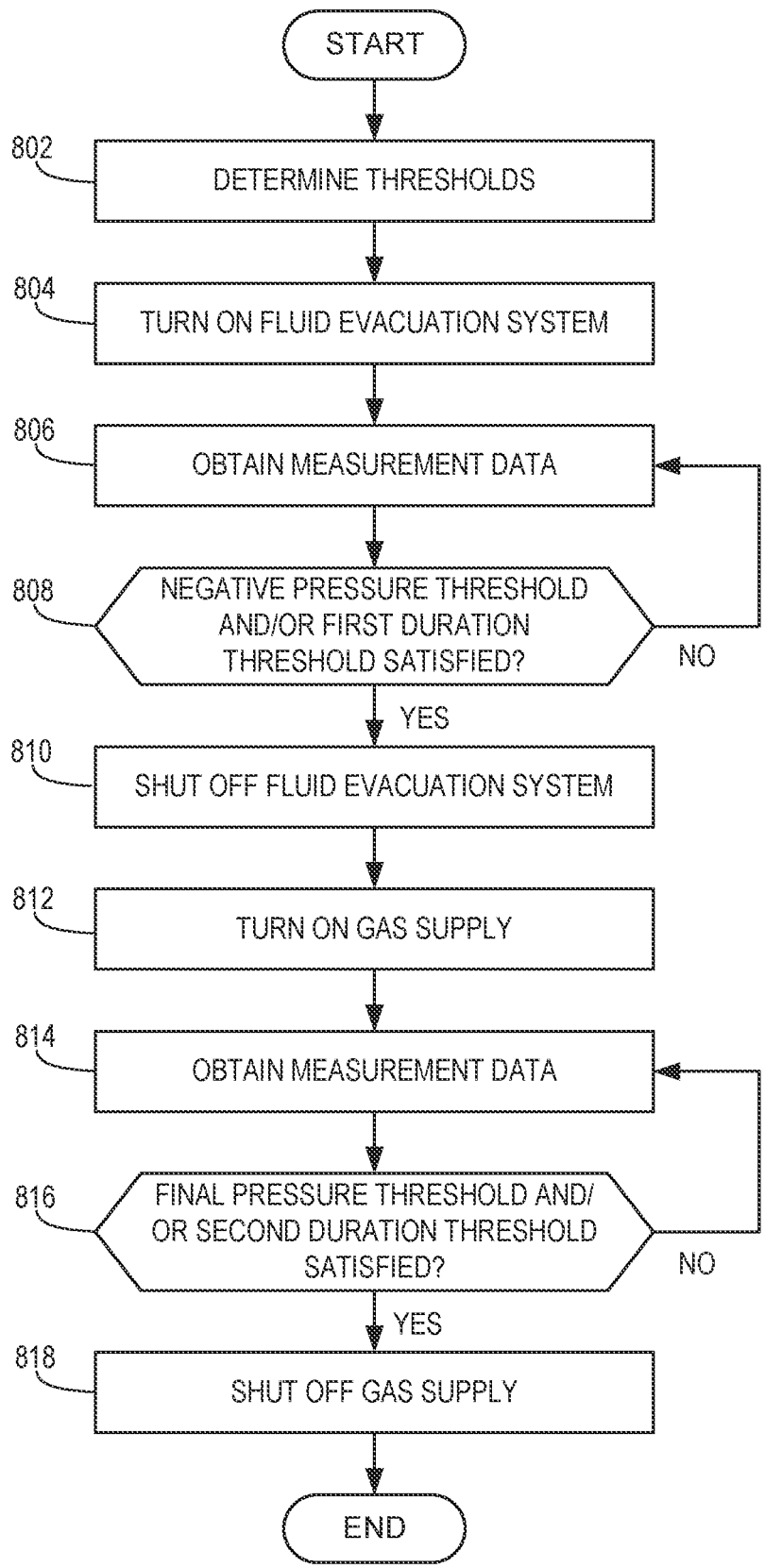
FIG. 8 is a flowchart representative of example machine readable instructions that may be executed by example processor circuitry to implement the example evacuation control circuitry of FIG. 7.

A flowchart representative of example hardware logic circuitry, machine readable instructions, hardware implemented state machines, and/or any combination thereof for implementing the evacuation control circuitry 206 of FIG. 7 is shown in FIG. 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example evacuation control circuitry 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by the fluid evacuation circuitry 206 of FIG. 7 to control evacuation and/or commissioning of the pipe 102 of FIG. 2. The machine readable instruction and/or operations 800 begin when the valve 104, 106 of FIG. 2 are closed, the gas supply 116 is coupled to the gas inlet 112, the fluid evacuation system 200 is coupled to the vent 114, and the pressure gauge 202 is coupled to the pipe 102. The machine readable instructions and/or operations 800 of FIG. 8 begin at block 802, at which the example fluid evacuation circuitry 206 determines one or more thresholds. For example, the example threshold calculation circuitry 704 of FIG. 7 determines the negative pressure threshold, the final pressure threshold, the first threshold duration, and/or the second threshold duration based on a desired gas concentration and the example table 400 of FIG. 4.

At block 804, the example fluid evacuation circuitry 206 turns on the fluid evacuation system 200. For example, the example system control circuitry 712 turns on the fluid evacuation system 200 to begin evacuation and/or compression of first fluid (e.g., air) from the pipe 102 via the vent 114.

At block 806, the example fluid evacuation circuitry 206 obtains measurement data. For example, the example input interface circuitry 702 obtains and/or otherwise receives the measurement data from the pressure gauge 202, where the measurement data includes a gauge pressure (e.g., in psig) and/or an absolute pressure (e.g., in psia) in the pipe 102.

At block 808, the example fluid evacuation circuitry 206 determines whether the negative pressure threshold and/or the first duration threshold are satisfied. For example, the example pressure determination circuitry 706 of determines whether the negative pressure threshold is satisfied by comparing the gauge pressure and/or the absolute pressure to the negative pressure threshold. Additionally or alternatively, the example timing control circuitry 708 determines whether the first duration threshold is satisfied by determining a first duration of time for which the fluid evacuation circuitry 206 operates, and comparing the first duration to the first duration threshold. In response to the pressure determination circuitry 706 determining that the negative pressure threshold is satisfied and/or the timing control circuitry 708 determining that the first duration threshold is satisfied (e.g., block 808 returns a result of YES), control proceeds to block 810. Alternatively, in response to the pressure determination circuitry 706 determining that the negative pressure threshold is not satisfied and the timing control circuitry 708 determining that the first duration threshold is not satisfied (e.g., block 808 returns a result of NO), control returns to block 806.

At block 810, the fluid evacuation circuitry 206 shuts off the fluid evacuation system 200. For example, the system control circuitry 712 shuts off the fluid evacuation system 200 to stop evacuation and/or compression of the first fluid from the pipe 102.

At block 812, the fluid evacuation circuitry 206 turns on the gas supply 116. For example, the gas supply control circuitry 710 turns on the gas supply 116 to provide second fluid (e.g., gas) to the pipe 102 via the gas inlet 112.

At block 814, the example fluid evacuation circuitry 206 obtains measurement data. For example, the input interface circuitry 702 obtains and/or otherwise receives the gauge pressure and/or the absolute pressure from the pressure gauge 202.

At block 816, the example fluid evacuation circuitry 206 determines whether the negative pressure threshold and/or the first duration threshold are satisfied. For example, the example pressure determination circuitry 706 of determines whether the final pressure threshold is satisfied by comparing the gauge pressure and/or the absolute pressure to the final pressure threshold. Additionally or alternatively, the example timing control circuitry 708 determines whether the second duration threshold is satisfied by determining a second duration of time for which the gas supply 116 operates, and comparing the second duration to the second duration threshold. In response to the pressure determination circuitry 706 determining that the final pressure threshold is satisfied and/or the timing control circuitry 708 determining that the second duration threshold is satisfied (e.g., block 816 returns a result of YES), control proceeds to block 818. Alternatively, in response to the pressure determination circuitry 706 determining that the final pressure threshold is not satisfied and the timing control circuitry 708 determining that the second duration threshold is not satisfied (e.g., block 816 returns a result of NO), control returns to block 814.

At block 818, the example fluid evacuation circuitry 206 shuts off the gas supply 116. For example, the gas supply control circuitry 710 shuts off the gas supply 116 to prevent the gas supply 116 from providing the second fluid to the pipe 102.

Figure 9:
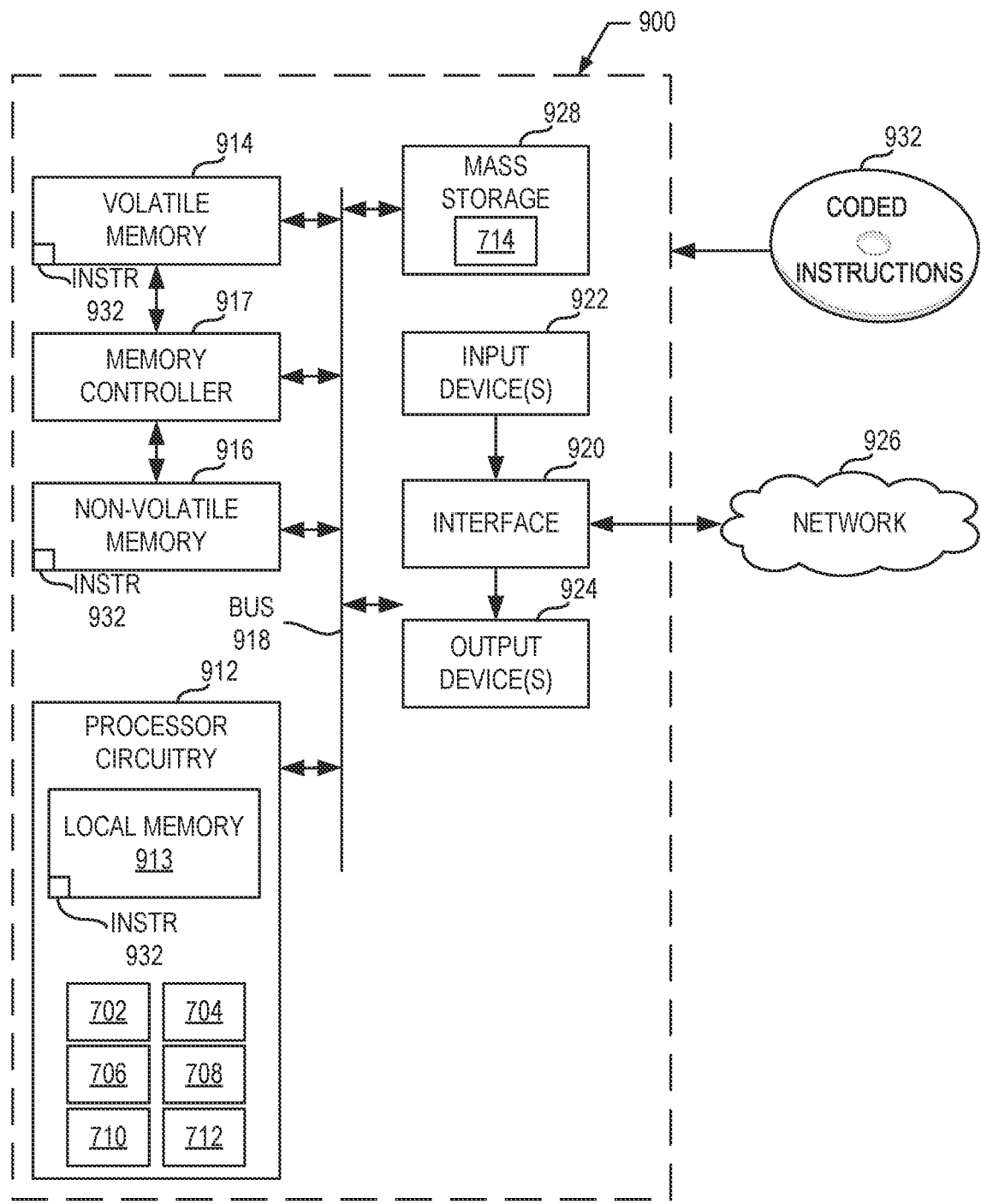
FIG. 9 is a block diagram of an example processing platform including processor circuitry structured to execute the example machine readable instructions of FIG. 8 to implement the example evacuation control circuitry of FIG. 7.

FIG. 9 is a block diagram of an example processor platform 900 structured to execute and/or instantiate the machine readable instructions and/or operations of FIG. 8 to implement the evacuation control circuitry 206 of FIG. 7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example input interface circuitry 702, the example threshold calculation circuitry 704, the example pressure determination circuitry 706, the example timing control circuitry 708, the example gas supply control circuitry 710, and the example system control circuitry 712.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIG. 8, may be stored in the mass storage device 928, in the volatile memory 914, in the non-volatile memory 916, and/or on a removable non-transitory computer readable storage medium such as a CD or DVD.

Figure 10:
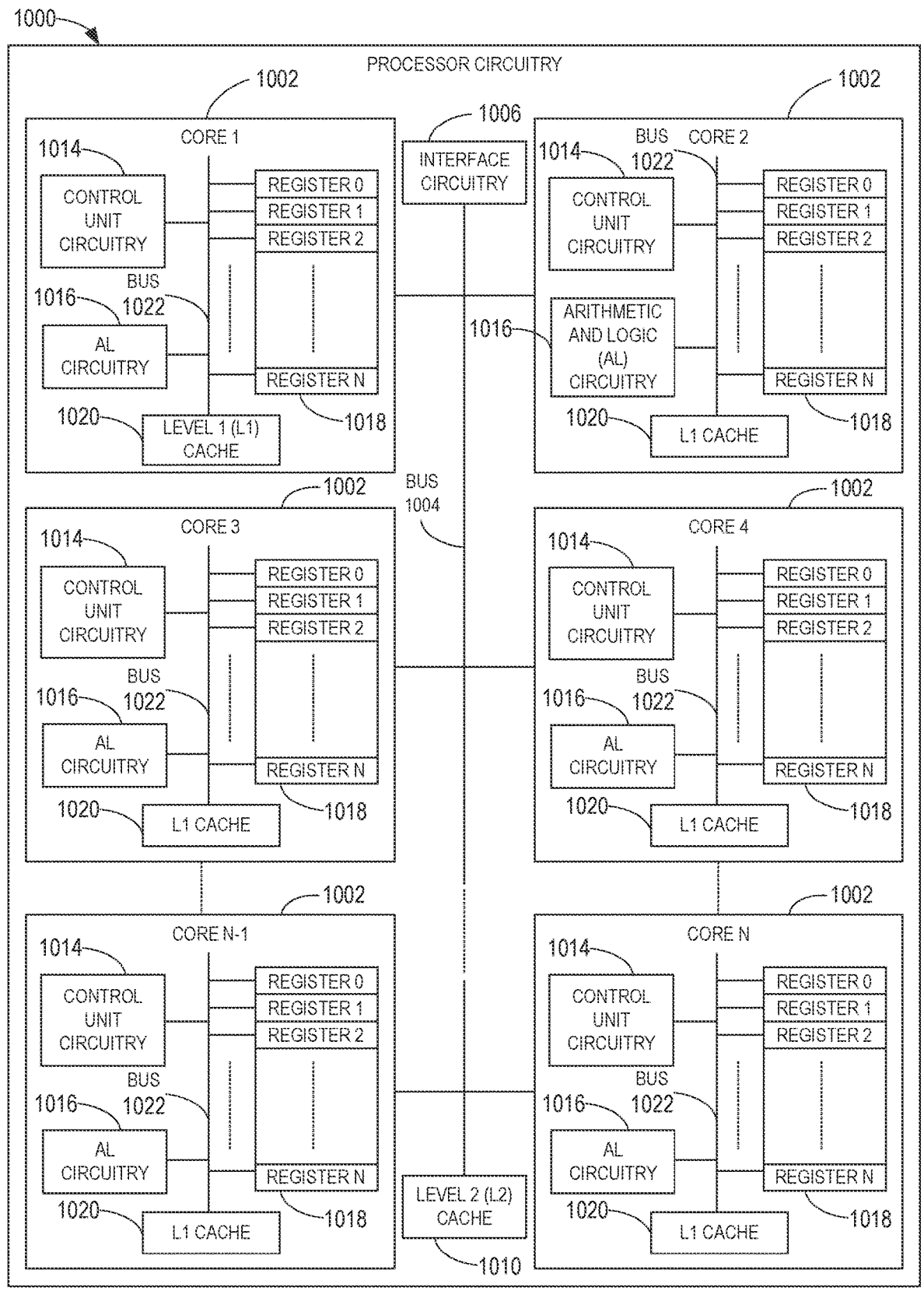
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 8.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
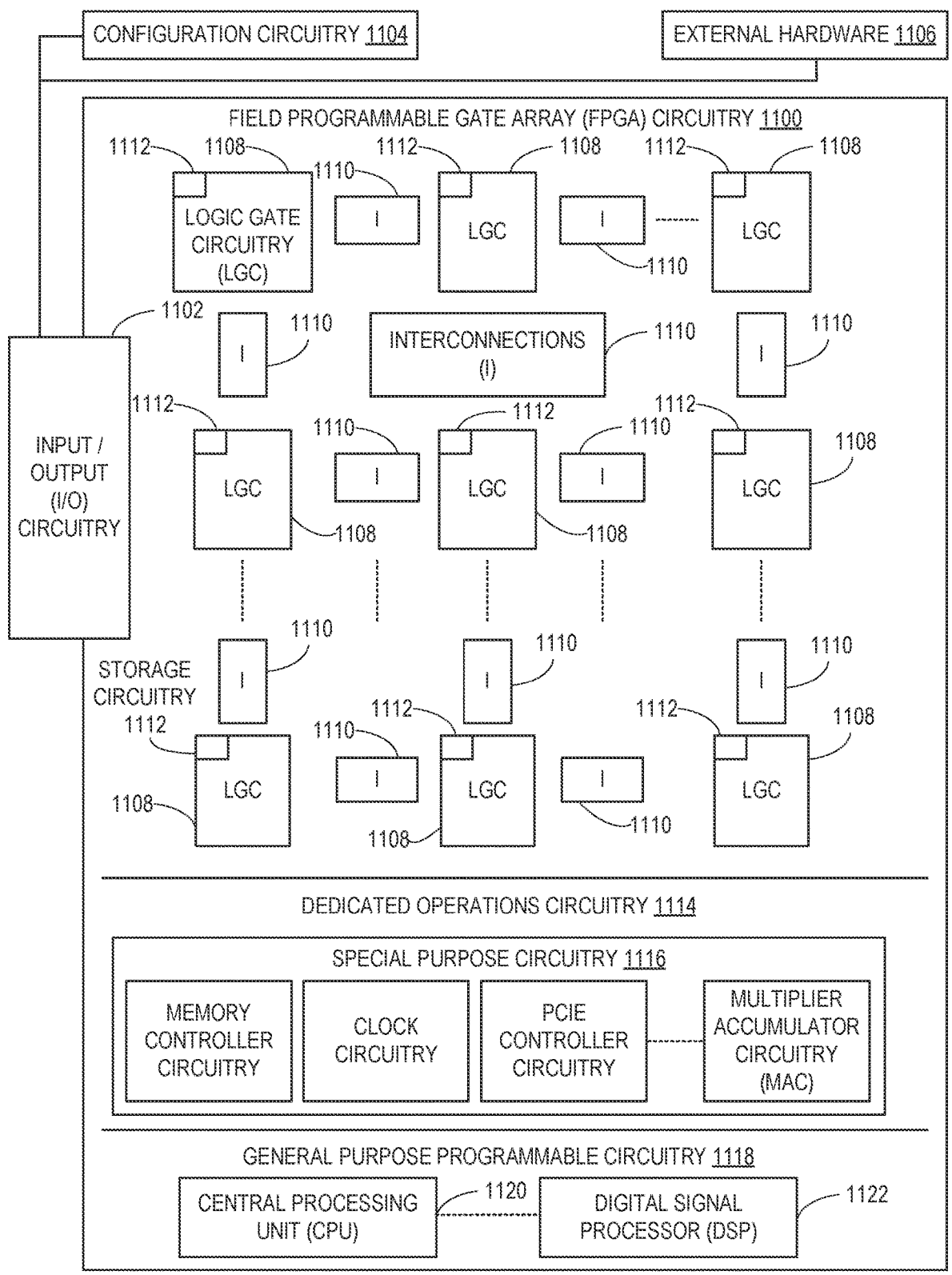
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1100 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware _06 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIG. 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 8 may be executed by one or more of the cores 1002 of FIG. 10 and a second portion of the machine readable instructions represented by the flowchart of FIG. 8 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that evacuate air from a pipe and supply gas to the pipe to a desired gas concentration and/or gauge pressure. The disclosed methods, apparatus and articles of manufacture improve the efficiency of a commissioning procedure for a gas pipeline by reducing an amount of gas vented to the atmosphere, thus reducing cost of the gas and reducing risk of accidental ignition of the gas during commissioning.

Example 1 includes an apparatus to evacuate fluid from a pipe. The example apparatus of Example 1 includes a pressure gauge coupled to the pipe, a fluid evacuation system coupled to the pipe, the fluid evacuation system to evacuate a first fluid from the pipe and, in response to the pressure gauge measuring a first pressure in the pipe, stop evacuating the first fluid from the pipe, and a gas supply coupled to the pipe, the gas supply to supply a second fluid to the pipe and, in response to the pressure gauge measuring a second pressure in the pipe, stop supplying the second fluid to the pipe.

Example 2 includes the apparatus of Example 1, where the first fluid is air and the second fluid is gas.

Example 3 includes the apparatus of Example 1, where the first pressure satisfies a negative pressure threshold, the negative pressure threshold less than zero atmospheric pressure.

Example 4 includes the apparatus of Example 3, where the negative pressure threshold is determined based on a desired concentration of the second fluid relative to the first fluid in the pipe.

Example 5 includes the apparatus of Example 4, where the fluid evacuation system is to evacuate the first fluid from the pipe for a first duration, the gas supply is to supply the second fluid to the pipe for a second duration, the first and second durations based on the desired concentration.

Example 6 includes the apparatus of Example 5, where the fluid evacuation system is to stop evacuating the first fluid from the pipe when the first duration expires.

Example 7 includes the apparatus of Example 1, where the fluid evacuation system includes one or more compressors, the one or more compressors configurable between a series arrangement and a parallel arrangement.

Example 8 includes a method including evacuating, via a fluid evacuation system, a first fluid from a pipe, in response to determining that a pressure in the pipe satisfies a first pressure threshold, stopping evacuation of the first fluid from the pipe, supplying, via a gas supply, a second fluid to the pipe, and in response to determining that the pressure in the pipe satisfies a second pressure threshold, stopping supply of the second fluid to the pipe.

Example 9 includes the method of Example 8, where the first fluid is air and the second fluid is gas.

Example 10 includes the method of Example 8, and further includes determining the first and second pressure thresholds based on a desired concentration of the second fluid relative to the first fluid in the pipe.

Example 11 includes the method of Example 10, and further includes evacuating the first fluid from the pipe for a first duration, and supplying the second fluid to the pipe for a second duration, the first and second durations based on the desired concentration.

Example 12 includes the method of Example 11, and further includes stopping the evacuation of the first fluid from the pipe when the first duration expires, and stopping the supply of the second fluid to the pipe when the second duration expires.

Example 13 includes the method of Example 8, and further includes increasing a differential pressure across the fluid evacuation system by switching compressors of the fluid evacuation system from a parallel arrangement to a series arrangement.

Example 14 includes the method of Example 8, where the evacuating the first fluid includes disabling an under-pressure cutoff of the fluid evacuation system.

Example 15 includes an apparatus including means for evacuating first fluid from the pipe, the means for evacuating the first fluid to stop evacuation of the first fluid when a pressure in the pipe satisfies a first threshold, and means for supplying second fluid to the pipe, the means for supplying the second fluid to stop supply of the second fluid when a pressure in the pipe satisfies a second threshold.

Example 16 includes the apparatus of Example 15, and further includes means for measuring to measure the pressure in the pipe.

Example 17 includes the apparatus of Example 16, and further includes means for controlling to obtain the pressure from the means for measuring, determining whether the pressure satisfies the first threshold, and causing the means for evacuating to stop evacuation of the first fluid and causing the means for supplying to supply the second fluid in response to determining that the pressure satisfies the first threshold.

Example 18 includes the apparatus of Example 17, where the means for controlling is to cause the means for supplying to stop the supply of the second fluid in response to determining that the pressure satisfies the second threshold.

Example 19 includes the apparatus of Example 15, where the first and second thresholds are based on a desired concentration of the second fluid relative to the first fluid in the pipe.

Example 20 includes the apparatus of Example 15, where the means for evacuating includes one or more means for compressing, the one or more means for compressing configurable between a series arrangement and a parallel arrangement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to evacuate fluid from a pipe, the apparatus comprising:
   a pressure gauge coupled to the pipe;
   a fluid evacuation system coupled to the pipe, the fluid evacuation system to evacuate a first fluid from the pipe and, in response to the pressure gauge measuring a first pressure in the pipe, stop evacuating the first fluid from the pipe, the first pressure being determined based on a set of values including (a) first values representative of durations from a start time at which the fluid evacuation system begins evacuation and (b) second values representative of pressures in the pipe at the corresponding durations, the first pressure being a determined pressure to which the pipe is to be evacuated in order to obtain at least a predetermined concentration of a second fluid in the pipe when the pipe is subsequently refilled with the second fluid to a second pressure; and a gas supply coupled to the pipe, the gas supply to supply the second fluid to the pipe and, in response to the pressure gauge measuring the second pressure in the pipe, stop supplying the second fluid to the pipe.

2. The apparatus of claim 1, wherein the first fluid is air and the second fluid is gas.

3. The apparatus of claim 1, wherein the first pressure satisfies a negative pressure threshold, the negative pressure threshold less than zero atmospheric pressure.

4. The apparatus of claim 3, wherein the negative pressure threshold is determined based on a desired concentration of the second fluid relative to the first fluid in the pipe.

5. The apparatus of claim 4, wherein the fluid evacuation system is to evacuate the first fluid from the pipe for a first duration, the gas supply is to supply the second fluid to the pipe for a second duration, the first and second durations based on the desired concentration.

6. The apparatus of claim 5, wherein the fluid evacuation system is to stop evacuating the first fluid from the pipe when the first duration expires.

7. The apparatus of claim 1, wherein the fluid evacuation system includes one or more compressors, the one or more compressors configurable between a series arrangement and a parallel arrangement.

8. A method comprising:
   evacuating, via a fluid evacuation system, a first fluid from a pipe;
   in response to determining that a pressure in the pipe satisfies a first pressure threshold, stopping evacuation of the first fluid from the pipe, the first pressure threshold being determined based on a set of values including (a) first values representative of durations from a start time at which the fluid evacuation system begins evacuation and (b) second values representative of pressures in the pipe at the corresponding durations, the first pressure threshold being a determined pressure to which the pipe is to be evacuated in order to obtain at least a predetermined concentration of a second fluid in the pipe when the pipe is subsequently refilled with the second fluid to a second pressure satisfying a second pressure threshold;
   supplying, via a gas supply, the second fluid to the pipe; and
   in response to determining that the pressure in the pipe satisfies the second pressure threshold, stopping supply of the second fluid to the pipe.

9. The method of claim 8, wherein the first fluid is air and the second fluid is gas.

10. The method of claim 8, further including determining the first and second pressure thresholds based on a desired concentration of the second fluid relative to the first fluid in the pipe.

11. The method of claim 10, further including evacuating the first fluid from the pipe for a first duration, and supplying the second fluid to the pipe for a second duration, the first and second durations based on the desired concentration.

12. The method of claim 11, further including stopping the evacuation of the first fluid from the pipe when the first duration expires, and stopping the supply of the second fluid to the pipe when the second duration expires.

13. The method of claim 8, further including increasing a differential pressure across the fluid evacuation system by switching compressors of the fluid evacuation system from a parallel arrangement to a series arrangement.

14. The method of claim 8, wherein the evacuating the first fluid includes disabling an under-pressure cutoff of the fluid evacuation system.

15. An apparatus comprising:
   means for evacuating first fluid from a pipe, the means for evacuating the first fluid to stop evacuation of the first fluid when a pressure in the pipe satisfies a first threshold, the first threshold being determined based on a set of values including (a) first values representative of durations from a start time at which the means for evacuating the first fluid begins evacuation and (b) second values representative of pressures in the pipe at the corresponding durations, the first threshold being a determined pressure to which the pipe is to be evacuated in order to obtain at least a predetermined concentration of a second fluid in the pipe when the pipe is subsequently refilled with the second fluid to a second pressure satisfying a second threshold; and
   means for supplying the second fluid to the pipe, the means for supplying the second fluid to stop supply of the second fluid when the pressure in the pipe satisfies the second threshold.

16. The apparatus of claim 15, further including means for measuring to measure the pressure in the pipe.

17. The apparatus of claim 16, further including means for controlling to:
   obtain the pressure from the means for measuring;
   determining whether the pressure satisfies the first threshold; and
   causing the means for evacuating to stop evacuation of the first fluid and causing the means for supplying to supply the second fluid in response to determining that the pressure satisfies the first threshold.

18. The apparatus of claim 17, wherein the means for controlling is to cause the means for supplying to stop the supply of the second fluid in response to determining that the pressure satisfies the second threshold.

19. The apparatus of claim 15, wherein the first and second thresholds are based on a desired concentration of the second fluid relative to the first fluid in the pipe.

20. The apparatus of claim 15, wherein the means for evacuating includes one or more means for compressing, the one or more means for compressing configurable between a series arrangement and a parallel arrangement.

* * * * *